(12) United States Patent
Ji et al.

(10) Patent No.: US 7,066,983 B2
(45) Date of Patent: Jun. 27, 2006

(54) METHOD FOR THIOSULFATE LEACHING OF PRECIOUS METAL-CONTAINING MATERIALS

(75) Inventors: Jinxing Ji, Burnaby (CA); Christopher Andrew Fleming, Omemee (CA); Paul George West-Sells, Vancouver (CA); Ralph Peter Hackl, Vancouver (CA)

(73) Assignee: Placer Dome Technical Services Limited, Vancouver (CA)

( * ) Notice: Subject to any disclaimer, the term of this patent is extended or adjusted under 35 U.S.C. 154(b) by 0 days.

(21) Appl. No.: 10/446,548

(22) Filed: May 27, 2003

(65) Prior Publication Data

US 2004/0035252 A1 Feb. 26, 2004

Related U.S. Application Data

(62) Division of application No. 09/852,699, filed on May 11, 2001, now Pat. No. 6,660,059.

(60) Provisional application No. 60/205,472, filed on May 19, 2000.

(51) Int. Cl.
*C22B 11/00* (2006.01)

(52) U.S. Cl. .............................. 75/744; 423/27; 423/29

(58) Field of Classification Search .................. 75/744; 423/47, 27, 29; 205/568
See application file for complete search history.

(56) References Cited

U.S. PATENT DOCUMENTS

| | | | |
|---|---|---|---|
| 496,951 A | 5/1893 | Parkes | |
| 1,627,582 A | 5/1927 | Terry | |
| 3,902,896 A | 9/1975 | Borbely et al. | 75/109 |
| 3,979,207 A | 9/1976 | MacGregor | 75/421 |
| 4,070,182 A * | 1/1978 | Genik-Sas-Berezowsky et al. | 75/736 |
| 4,269,622 A | 5/1981 | Kerley, Jr. | 75/103 |
| 4,289,532 A | 9/1981 | Matson et al. | 75/105 |
| 4,296,075 A | 10/1981 | Yan | 423/7 |
| 4,304,644 A | 12/1981 | Victorovich et al. | 204/108 |
| 4,369,061 A * | 1/1983 | Kerley, Jr. | 75/733 |
| 4,384,889 A | 5/1983 | Wiewiorowski et al. | 75/101 |
| 4,489,984 A | 12/1984 | Savins | 299/5 |
| 4,510,027 A | 4/1985 | Wiewiorowski et al. | 204/110 |
| 4,552,589 A | 11/1985 | Mason et al. | 75/105 |
| 4,571,264 A | 2/1986 | Weir et al. | 75/744 |
| 4,585,561 A | 4/1986 | Zlokarnik et al. | 75/713 |
| 4,605,439 A | 8/1986 | Weir | 75/744 |

(Continued)

FOREIGN PATENT DOCUMENTS

AU 574818 6/1986

(Continued)

OTHER PUBLICATIONS

Johnson, Paul H. et al., "Chemical Mining—A Study of Leaching Agents" New Mexico Bureau of Mines and Mineral Resources (1969), pp. 1-10.

(Continued)

*Primary Examiner*—Scott Kastler
(74) *Attorney, Agent, or Firm*—Sheridan Ross, P.C.

(57) ABSTRACT

Processes are provided for recovering precious metals from refractory materials using thiosulfate lixiviants. The processes can employ lixiviants that include at most only small amounts of copper and/or ammonia and operate at a relatively low pH, reduction of polythionates, inert atmospheres to control polythionate production, and electrolytic solutions which provide relatively high rates of precious metal recovery.

74 Claims, 9 Drawing Sheets

U.S. PATENT DOCUMENTS

| | | | |
|---|---|---|---|
| 4,632,701 A | 12/1986 | Genik-Sas-Berezowsky et al. | 75/118 |
| 4,634,187 A | 1/1987 | Huff et al. | 299/4 |
| 4,654,078 A | 3/1987 | Perez et al. | 75/118 |
| 4,654,079 A | 3/1987 | Nunez et al. | 423/29 |
| 4,684,404 A | 8/1987 | Kalocsai | 75/118 R |
| 4,723,998 A | 2/1988 | O'Neil | 75/101 |
| 4,738,718 A | 4/1988 | Bakshani et al. | 75/105 |
| 4,740,243 A | 4/1988 | Krebs-Yuill et al. | 75/101 R |
| 4,765,827 A | 8/1988 | Clough et al. | 75/2 |
| 4,778,519 A | 10/1988 | Pesic | 75/118 |
| 4,801,329 A | 1/1989 | Clough et al. | 75/97 |
| 4,816,234 A | 3/1989 | Brison et al. | 423/29 |
| 4,816,235 A | 3/1989 | Pesic | 423/32 |
| 4,902,345 A | 2/1990 | Ball et al. | 75/118 |
| 4,913,730 A | 4/1990 | Deschenes et al. | 75/370 |
| 4,923,510 A | 5/1990 | Ramadorai et al. | 423/29 |
| 4,925,485 A | 5/1990 | Schulze | 423/22 |
| 4,980,134 A | 12/1990 | Butler | 423/27 |
| 5,071,477 A | 12/1991 | Thomas et al. | 75/118 |
| 5,114,687 A | 5/1992 | Han et al. | 423/32 |
| 5,127,942 A | 7/1992 | Brierley et al. | 75/743 |
| 5,147,617 A | 9/1992 | Touro et al. | 423/27 |
| 5,147,618 A | 9/1992 | Touro et al. | 423/27 |
| 5,215,575 A | 6/1993 | Butler | 75/744 |
| 5,232,490 A | 8/1993 | Bender et al. | 75/733 |
| 5,236,492 A | 8/1993 | Shaw et al. | 75/744 |
| 5,244,493 A | 9/1993 | Brierley et al. | 75/743 |
| 5,246,486 A | 9/1993 | Brierley et al. | |
| 5,308,381 A | 5/1994 | Han et al. | 75/744 |
| 5,338,338 A | 8/1994 | Kohr | 75/711 |
| 5,354,359 A | 10/1994 | Wan et al. | 75/744 |
| 5,364,453 A | 11/1994 | Kohr | 75/711 |
| 5,405,430 A | 4/1995 | Groves et al. | 75/744 |
| 5,443,621 A | 8/1995 | Kohr | 75/711 |
| 5,484,470 A | 1/1996 | Kristjansdottir et al. | |
| 5,489,326 A | 2/1996 | Thomas et al. | 75/744 |
| 5,536,297 A | 7/1996 | Marchbank et al. | 75/736 |
| 5,536,480 A | 7/1996 | Simmons | 423/28 |
| 5,626,647 A | 5/1997 | Kohr | 75/744 |
| 5,785,736 A | 7/1998 | Thomas et al. | 75/736 |
| 5,876,588 A | 3/1999 | Lalancette et al. | 205/560 |
| 5,939,034 A | 8/1999 | Virnig et al. | 423/24 |
| 6,197,214 B1 | 3/2001 | Virnig et al. | 252/184 |
| 6,344,068 B1 | 2/2002 | Fleming et al. | 75/736 |
| 6,451,275 B1 | 9/2002 | Fleming | 423/47 |
| 6,500,231 B1 | 12/2002 | Wan | |
| 6,602,319 B1 | 8/2003 | Murthy et al. | |
| 6,632,264 B1 | 10/2003 | Zhang et al. | |
| 6,660,059 B1 | 12/2003 | Ji et al. | 75/744 |
| 2003/0154822 A1* | 8/2003 | Hall et al. | 75/744 |

FOREIGN PATENT DOCUMENTS

| | | |
|---|---|---|
| AU | 199918525 | 9/1999 |
| AU | 200131355 | 10/2001 |
| EP | 316094 | 5/1989 |
| EP | 522978 | 1/1993 |
| EP | 1 433 860 A1 | 6/2004 |
| GB | 2180829 | 4/1987 |
| GB | 2310424 | 8/1997 |
| JP | 61127834 | 6/1984 |
| JP | 60208434 | 10/1985 |
| JP | 61127833 | 6/1986 |
| RO | 81261 | 2/1983 |
| WO | WO 91/11539 | 8/1991 |
| WO | WO 94/06944 | 3/1994 |
| WO | WO 95/04164 | 2/1995 |
| WO | WO 97/49474 | 12/1997 |
| WO | WO 99/13116 | 3/1999 |
| WO | WO 01/23626 | 4/2001 |
| WO | WO 01/42519 | 6/2001 |
| WO | WO 2001/42519 A1 | 6/2001 |
| WO | WO02/27045 A1 | 4/2002 |
| WO | WO 2003/080879 A1 | 10/2003 |
| WO | WO 2004/005556 A1 | 1/2004 |
| WO | WO 2005/017215 A1 | 2/2005 |
| ZA | 770840 | 1/1978 |

OTHER PUBLICATIONS

Examiner's report for Australian Application No. 2001274393 dated Apr. 18, 2005.

U.S. Appl. No. 10/836,480, filed Apr. 30, 2004, West-Sells et al.

Abbruzzese, C. et al.; "Thiosulphate Leaching for Gold Hydrometallurgy." *Hydrometallurgy*, vol. 39 (Dec. 1995), pp. 265-276.

Abbruzzese, C. et al.; "Nuove Prospettive Per II Recupero Dell'oro Dal Mineralia: La Lisciviazione Con Tiosolfata," *l'industria mineraria*, No. 4 (1994), pp. 10-14.

Ablimt, Ablet et al.; "Study on Intensified Leaching of Gold with Thiosulfate," *Xingliang Res. Inst. of Chemistry; PRC*, vol. 20 (1) (Dec. 1999), pp. 39-41.

Agadzhanyan et al.; "Kinetics of Ion Exchange in Selective Systems. II. Kinetics of the Exchange of Differently charged Ions in a Macroporous ion Exchanger"; Published in the Russian Journal of Physical Chemistry; 61(7), Apr. 1987; pp. 994-997.

Atluri et al.; "Recovery of Silver from Ammoniacal Thiosulfate Solutions"; Published in Proceedings of a Symposium on Precious and Rare Metals held in Albuquerque, NM; Apr. 6-8, 1988, pp. 290-305.

Atluri, Vasudeva Prasad; "Recovery of Gold and Silver from Ammoniacal Thiosulfate Solutions Containing Copper by Resin ion Exchange Method"; A Thesis Submitted to the Faculty of the Department of Materials Science and Engineering at the University of Arizona, Dec. 1987, 219 pages.

Anzhang, Mao et al.; "One-Step Leaching of Some Refractory Gold Concentrate Containing Arsenic and Theory Analysis," *J. Cent. South Univ. Technol.*, vol. 4, No. 2 (Nov. 1997).

Awadalla, F.T. et al.; "Recovery of Gold from Thiourea, Thiocyanate, or Thiosulfate Solutions by Reduction-Precipitation with a Stabilized Form of Sodium Borohydride," *Separation Science and Technology*, vol. 26, No. 9 (Dec. 1991), pp. 1207-1228.

Aylmore et al., "Thermodynamic Analysis of Gold Leaching by Ammoniacal Thiosulfate Using Eh/pH Speciation Diagrams"; Minerals & Metallurgical Processing, vol. 16, No. 4, Nov. 2001; pp. 221-227.

Bagdasaryan, K.A.; "A Study of Gold and Silver . . . " *Izvestiia Vysshikh Uchebnykh Zavedenii Tsvetnaia Mettallurgiia*, vol. 5, (Dec. 1983), pp. 64-68.

Bartels, K.; "Chemical Abstract Index Compilation for Thiosalts and Related Compounds," CANMET Mineral Sciences Laboratories Report MRP/MSL 77-214 (TR) (Nov. 1978), pp. 1-5, A1-A17.

Benedetti, Marc and Boulegue; "Mechanism of Gold Transfer and Deposition in a Supergene Environment," *Geochimica Et Cosmochimica Acta*, vol. 55, pp. 1539-1547. Dec. 1991.

Berezowsky, R.M.G.S. et al.; "Recovery of Gold and Silver from Oxidation Leach Residues by Ammoniacal Thiosulphate Leaching," Paper presented at the 108th AIME Annual Meeting, New Orleans, Louisiana, Feb. 18-22, 1979, pp. 1-18.

Bhaduri, Rahul S.; "Lixiviation of Refractory Ores with Diethylamine or Ammonium Thiosulfate," A thesis submitted in partial fulfillment of the requirements for the degree of Master of Science in Metallurgical Engineering, Aug. 1987, University of Nevada, Reno.

Bhappu, R.B.; "Status of Non-Cyanide Heap Leaching and Other Cyanide Substitutes," Session Papers: American Mining Congress, vol. 1, Apr. 24-28, 1988, Chicago, pp. 275-287.

Block-Bolten, Andrew et al.; "New Possibilities in the Extraction of Gold and Silver from Zinc and Lead Sulfide Flotation Wastes," TMS-AIME Fall Extractive Meeting, held in San Diego, CA; pp. 149-166. Dec. 1985.

Block-Bolten, Andrew et al.; "Gold and Silver Extraction from Complex Sulfide Wastes;" Recycle and Secondary Recovery of Metals: Proceedings of the Int'l. Symposium on Recycle and Secondary Recovery of Metals and the Fall Extractive and Process Metallurgy Meeting, pp. 715-726. Dec. 1985.

Block-Bolten, A. et al.; "Thiosulfate Leaching of Gold from Sulfide Wastes," *Metall.* vol. 40, No. 7 (Jul. 1986), pp. 687-689.

Bourge, Christian; "Thiosulfate may replace cyanide in leaching," *American Metal Market*, vol. 107, No. 40 (Mar. 2, 1999), p. 6.

Breuer, P.L. et al.; "Thiosulfate Leaching Kinetics of Gold in the Presence of Copper and Ammonia," *Minerals Engineering*, vol. 15, No. 10-11, pp. 1071-1081. Dec. 2000.

Breuer, P.L. et al.; "Fundamental Aspects of the Gold Thiosulfate Leaching Process," presented at TMS Meeting, Feb. 2001.

Breuer, Paul et al.; "An Electrochemical Study of Gold Oxidation in Solutions Containing Thiosulfate, Ammonia and Copper," Department of Chemical Engineering, Monash University, Australia, no date.

Briones, R. et al.; "The Leaching of Silver Sulfide with the Thiosulfate-Ammonia-Cupric Ion System," *Hydrometallurgy*, vol. 20, pp. 243-260. Dec. 1998.

Byerley, J.J. et al.; "The Oxidation of Thiosulfate in Aqueous Ammonia by Copper (II) Oxygen Complexes," *Inorg. Nucl. Chem. Letters*, vol. 9, pp. 879-883. Dec. 1973.

Byerley, John J. et al.; "Kinetics and Mechanism of the Oxidation of Thiosulfate Ions by Copper—(II) Ions in Aqueous Ammonia Solution," pp. 889-894. Dec. 1973.

Byerley, John J. et al.; "Activation of Copper (II) Ammine Complexes by Molecular Oxygen for the Oxidation of Thiosulfate Ions," *Journal of Chemical Society: Dalton Transactions*, pp. 1329-1338. Dec. 1975.

Caney, D.J.; "Thiosulfate shows leach promise—U.S. government study shows costs about the same as cyanide," *American Metal Market*, vol. 102, No. 196 (Oct. 11, 1994), p. 7.

Cao, Changlin et al.; "Leaching Gold by Low Concentration Thiosulfate Solution," *Transactions of NFsoc*, vol. 2, No. 4 (Nov. 1992), pp. 21-25.

Chanda, M. et al.; "Ion-Exchange Sorption of Thiosulfate and Tetrathionate on Protoriated Poly (4-Vinyl Pyridine)," *Reactive Polymers*, Vo. 2, pp. 269-278. Dec. 1984.

Chen, Jin et al.; "Electrochemistry of Gold Leaching with Thiosulfate (I) Behaviour and Mechanism of Anodic Dissolution of Gold," *J. Cent. South Inst. Min. Metall.*, vol. 24, No. 1 (Apr. 1993) (Published in Chinese), pp. 169-173.

de Jong, Govardus A.H. et al.; "Polythionate Degradation by tetrathionate hydrolase of *Thiobacillus ferroxidans*," *Microbiology*, vol. 143, pp. 499-504. Dec. 1997.

Deliang, Li et al.; "Studies on a United Non-Toxic Process to Recover Au/Cu from Complex Gold Ores Bearing Copper," *Journal of Xiangtan Mining Institute*, vol. 14, No. 2, pp. 50-54. Dec. 1999.

Dhawale, S.W.; "Thiosulfate: An Interesting Sulfur Oxoanion That Is Useful in Both Medicine and Industry-But Is Implicated in Corrosion," *Journal of Chemical Education*, vol. 70, No. 1 (Jan. 1993), pp. 12-14.

Feng, D. et al.; "Elution of Ion Exchange Resins by Use of Ultrasonication," *Hydrometallurgy*, vol. 55, pp. 201-212. Dec. 2000.

Feng, D. et al.; "Galvanic Interactions Between Sulphides and Manganese Dioxide in Thiosulphate Leaching of Gold Ores," Department of Chemical Engineering, The University of Melbourne, Victoria (undated).

Ferron, Cesar J. et al.; "Thiosulphate Leaching of Gold and Silver Ores: An Old Process Revisited"; Presented at 100$^{th}$ CIM Annual General Meeting, held in Montreal, Quebec, Canada May 3-7, 1998.

Ficeriova, Jana et al.; "Cyanideless Methods of Leaching of the Gold and Silver Concentrate Coming from Hodrusa After Pretreatment by Ultrafine Grinding," *Mineralia Slovaca*, vol. 31, No. 3-4, pp. 363-368. Dec. 1999.

Filho, Olavo Barbosa et al.; "Contribuica Ao Estudo Da Dissoluca Do Ouro Pelo Tiossulfato," *Mineral Technology*, vol. IV (Oct. 1994), pp. 265-279.

Fleming, C.A. et al.; "Recent Advances in the Development of an Alternative to the Cyanidation Process—Based on Thiosulfate Leaching and Resin in Pulp," Paper presented at Ballarat, Nov. 2000.

Flett, D.S. et al.; "Chemical Study of Thiosulphate Leaching of Silver Sulphide," *Trans. Instn. Min. Metall.*, vol. 92 (Dec. 1983), pp. C216-C223.

Foss, Olav et al.; "Displacement of Sulphite Groups of Polythionates by Thiosulphate," *Acta Chem. Scand.*, vol. 15, No. 1, pp. 1608-1611. Dec. 1961.

Gallagher, Neil P. et al.; "Affinity of Activated Carbon Towards Some Gold (I) Complexes," *Hydrometallurgy*, vol. 15, pp. 305-316. Dec. 1990.

Gallagher, Neil Paul; "Interaction of Gold Cyanide, Thiocyanate, Thiosulfate, and Thiourea Complexes with Carbon Matrices," A thesis submitted in partial fulfillment of the requirements for the degree of Master of Science in Metallurgical Engineering, May 1987, University of Nevada, Reno.

Gelves, G.A. et al.; "Recovering of Refractory Gold Using Ammonium Thiosulfate Solutions," Clean Technology for the Mining Industry, Proceeding of the III International Conference on Clean Technologies for the Mining Industry held in Santiago, Chile, May 15-17, 1996, pp. 477-487.

Goldhaber, Martin B.; "Experimental Study of Metastable Sulfur Oxyanion Formation During Pyrite Oxidation at pH 6-9 and 30° C.," *American Journal of Science*, vol. 283 (Mar. 1983), pp. 193-217.

Gong, Qian et al.; "Treatment of Sulphide Gold Concentrate Containing Copper with Thiosulfate Solution," Proceedings of Randol Gold Conference, Sacramento, pp. 131-135. Dec. 1989.

Gong, Qian et al.; "Treatment of Sulphide Gold Concentrate Containing Copper with Thiosulfate Solution" (published in Chinese), Engineering Chemist, vol. 11, No. 2, pp. 145-151. Dec. 1990.

Gong, Qian et al.; "Kinetics of Gold Leaching from Sulfide Gold Concentrates with Thiosulfate Solution," *Transaction of NFsoc*, vol. 3, No. 4 (Nov. 1993), pp. 30-36.

Groudev, S.N. et al.; "A Combined Chemical and Biological Heap Leaching of an Oxide Gold-Bearing Ore,"

*Physicochemical Problems of Mineral Processing*, vol. 33, pp. 55-61. Dec. 1999.

Groudev, S.N. et al.; "Extraction of Gold and Silver from Oxide Ores by Means of a Combined Biological and Chemical Leaching," Biohydrometallurgical Technologies: Proceedings of an International Biohydrometallurgy Symposium, held in Jackson Hole, Wyoming, Aug. 22-25, 1993; pp. 417-425.

Groudev, S.N. et al.; "Pilot Scale Microbial Leaching of Gold and Silver from an Oxide in Eishitza Mine, Bulgaria," Mineral Bioprocessing II: Proceedings of the Engineering Foundation Conference Minerals Processing II, held in Snowbird, Utah, Jul. 10-15, 1995, pp. 135-144.

Groudev, S.N. et al.; "Two-Stage Microbial Leaching of a Refractory Gold-Bearing Pyrite Ore," *Minerals Engineering*, vol. 9, No. 7, pp. 707-713. Dec. 1996.

Guerra, E. et al.; "A Study of the Factors Affecting copper Cementation of Gold from Ammoniacal Thiosulphate Solution," *Hydrometallurgy*, vol. 51, pp. 155-172. Dec. 1999.

Guerra, Eduard; "A Study of the Factors Affecting Copper Cementation of Gold from Ammoniacal Thiosulphate Solution," A Thesis submitted in partial fulfillment of the requirements for the Degree of Master of Applied Science in the faculty of graduate studies, Nov. 1997, pp. 1-74.

Gundiler, I.H. et al.; "Thiosulphate leaching of Gold from Copper-Bearing Ores," Presented at the SME annual Meeting held in Reno, Nevada, Feb. 15-18, 1993.

Han, K.N. et al.; "Factors Influencing the Rate of Dissolution of Gold in Ammoniacal Solutions," *Int. J. Miner. Process.*, vol. 58, pp. 369-381. Dec. 2000.

Hemmati, M. et al.; "Study of the Thiosulphate Leaching of Gold from Carbonaceous Ore and the Quantitative Determination of Thiosulphate in the Leached Solutions," Papers presented at the Extraction '89 symposium, organized by The Institution of Mining and Metallurgy and held in London, from Jul. 10-13, 1989, pp. 665-678.

Hiskey, J. Brent et al.; "Dissolution Chemistry of Gold and Silver in Different Lixiviants," *Mineral Processing and Extractive Metallurgy Review*, vol. 4, pp. 95-134. Dec. 1988.

Hitchen, A.; "Preparation of Potassium Tetrathionate and Potassium Trithionate for Studies of the Thiosalt Problem in Mining Effluents," CANMET Mineral Sciences Laboratories Report MRP/MSL 76-279 (TR) (Oct. 1976), pp. 1-5.

Hitchen, A. et al.; "A Review of Analytical Methods for the Determination of Polythionates, Thiosulphate, Sulphite and Sulphide in Mining Effluents," CANMET Mineral Sciences Laboratories Report MRP/MSL 76-208 (LS) (Aug. 1976), pp. 1-23.

Hu, Jiexue et al.; "Recovery of Gold from Thiosulfate Solution," *Engineering Chemistry and Metallurgy*, vol. 10, No 2 (May 1989), pp. 45-50.

Hu, Jiexue et al.; "Substitution of Sulfite with Sulfate in the Process of Extracting Gold by Thiosulfate Solution," *Engineering Chemistry & Metallurgy*, vol. 12, No. 4 (Nov. 1991), pp. 302-305.

Huang, Wanfu et al.; "Theory and Practice of Leaching Gold by Thiosulfate," *South Inst of Metallurgy PRC*, vol. 19, No. 9, pp. 34-36. Dec. 1998.

Idriss, K.A. et al.; "A New Method for the Macro-and Microdetermination of Tri-and Tetrathionate," *Can. J. Chem.*, vol. 55, pp. 3887-3893. Dec. 1977.

Jacobson, R.H. et al.; "Gold Solution Mining," Proceedings of a Symposium on Precious and Rare Metals, Albuquerque, NM, Apr. 6/8, 1988, pp. 157-174.

Jagushte, Milind V. et al.; "Insight Into Spent Caustic Treatment: On Wet Oxidation of Thiosulfate to Sulfate," *J. Chem Technol. Biotechnol*, vol. 74, pp. 437-444. Dec. 1999.

Ji, Caixia et al.; Research and Optimization of Thiosulfate leaching Technology of Gold, *Rare Metals: A Chinese Journal of Science, Technology & Applications in the Field of Rare Metals*, vol. 10, No. 4 (Oct. 1991), pp. 275-280.

Kelly, D.P.; "Oxidation of Thiosulphate During Chromatography in the Presence of Copper or Gold Ions," *Journal of Chromatography*, vol. 66, No. 1J., pp. 185-188. Dec. 1972.

Kim, Sun Kyu et al.; "Extraction of Gold from a Gold Ore by Ammonium Thiosulphate Leaching," *Journal of the Korean Inst. Of Metals*, vol. 28, No. 12, pp. 1048-1053. Dec. 1990.

Koh, Tomozo et al.; "Spectrophotometric Determination of Total Amounts of Polythionates (tetra-, Penta-, and Hexathionate) in Mixtures with Thiosulfate and Sulfite," *Analytical Chemistry*, vol. 45 (Oct. 1973), pp. 2018-2022.

Koh, Tomozo et al.; "The Determination of Micro Amounts of Polythionates," *Anal. Chin. Acta*, vol. 61, pp. 451-460. Dec. 1972.

Kononova, O.N. et al.; "Sorption Recoveryj of Gold from Thiosulphate Solutions After Leaching of Products of Chemical Preparation of Hard Concentrates," *Hydrometallurgy*, vol. 59 (Jan. 2001), pp. 115-123.

Kravetz, Mark, "Cyanide Destruction Using Catalyzed Thiosulfates," Cherokee Chemical Engineering Company, Inc. (undated), 4 pages.

Kucha, H. et al.; Gold-Pyrite Association-Result of Oxysulphide and Polysulphide Transport of Gold? *Trans. Inst. Min. Metall.* (Sect. B: Appl. Earth Sci.) 103, Sep.-Dec. 1994.

Langhans Jr., J.W. et al.; "Copper-Catalyzed Thiosulfate Leaching of Low-Grade Gold Ores," *Hydrometallurgy*, vol. 29, pp. 191-203. Dec. 1992.

Langhans Jr., J.W. et al.; "Gold Extraction from Low Grade Carbonaceous Ore Using Thiosulfate," Practical Aspects of International Management and Processing, SME, pp. 85-94. Dec. 1996.

Levenson, G.I.P. et al.; "The Stability of Concentrated Thiosulphate solutions at High Temperature. Part II. The Loss of the Sulphite." The Journal of Photographic Science. vol. 13, pp. 79-81. Dec. 1965.

Li, J. et al.; "Important Solution Chemistry Factors That Influence the Copper-Catalyzed Ammonium Thiosulfate Leaching of Gold," Presented at the 125th SME Annual Meeting held in Phoenix, Arizona, Mar. 11-14, 1996, pp. 1-20.

Li, J. et al.; "Copper Catalyzed Ammoniacal Thiosulfate Leaching of Gold and Silver—Solution Chemistry," 34 pages. No Date.

Li, J. et al.; "The Ammoniacal Thiosulfate System for Precious Metal Recovery"; Published in the Proceedings of the XIX International Mineral Processing Congress, Precious Metals Processing and Mineral Waste and the Environment, vol. 4, Chapter 7, pp. 37-42. Dec. 1995.

Li, Ruxiong et al.; "Leaching Gold with Thiosulfate Solution Containing Added Sodium Chloride and Sodium Dodecyl Sulphonate," *Engineering Chemistry & Metallurgy*, vol. 19, No. 1 (Feb. 1998), pp. 76-82.

Lukomskaya, G.A. et al.; "Extraction of Copper Gold and Silver from Tailings by Thiosulfate Heap Leaching," *Russian Journal of Non-Ferrous Metals*, vol. 40, No. 4, pp. 48-49. Dec. 1999.

Makhija, R. et al.; "Determination of Polythionates and Thiosulphate in Mining Effluents and Mill Circuit Solutions," *Talanta*, vol. 25, pp. 79-84. Dec. 1978.

Makhija, R. et al.; "The Titrimetric Determination of Sulphate, Thiosulphate and Polythionates in Mining Effluents," CANMET Mineral Sciences Laboratories Report MRP/MSL 78-57(J), (Feb. 1978), pp. 1-14.

Makhija, Ramesh; "The Determination of Polythionates and Thiosulphate in Mining Effluents and Mill Circuit Samples," Mineral Sciences Laboratories Report MRP/MSL 76-361 (TR) (Dec. 1976), pp. 1-9.

Marcus, Y.; "The Anion Exchange of Metal Complexes—The Silver—Thiosulphate System," *ACTA Chemica Scandinavica* 11, pp. 619-627. Dec. 1957.

McPartland, Jack S. et al.; "Concentration and Reduction of Au(I) Thiosulphate to Metallic Gold," Metal Separation Technologies Beyond 2000: Integrating Novel Chemistry with Processing (Eds. K.C. Liddell and D.J. Chaiko, TMS), pp. 105-115. Dec. 1999.

McPartland, Jack S. et al.; "Leaching of precious Metal Ores Using Thiosulfate," Metal Separation Technologies Beyond 2000: Integrating Novel Chemistry with Processing (Eds. K.C. Liddell and D.J. Chaiko, TMS), pp. 93-103. Dec. 1999.

Meyer, B. et al.; "Raman Spectrometric Study of the Thermal Decomposition of Aqueous Tri- and Tetrathionate," *Phosphorus and Sulfur*, vol. 14, pp. 23-36. Dec. 1982.

Michel, Didier et al.; "Electrochemical Investigation of the Thiosulfate Gold Leaching Process," presented at CIM Gold Symposium, Montreal 98, May 1998, 12 pages.

Michel, Didier et al.; "Integration of Amino Acids in the Thiosulfate Gold Leaching Process," Randol Glod & Silver Forum, pp. 99-103. Dec. 1999.

Mizoguchi, Tadaaki et al.; "The Chemical Behavior of Low Valence Sulfur Compounds.X." Disproportionation of Thiosulfate, Trithionate, Tetrathionate and Sulfite Under Acidic Conditions, *Bulletin of the Chemical Society of Japan*, vol. 49(1), pp. 70-75. Dec. 1976.

Murthy, D.S.R. et al.; "Leaching of Gold and Silver from Miller Process Dross Through Non-Cyanide Leachants," *Hydrometallurgy*, vol. 42, pp. 27-33. Dec. 1996.

Murthy, D.S.R.; "Some Studies on the Extraction of Gold and Silver from Lead-Zinc Sulphide Flotation Tailings through Non-Cyanide Leachants," *Trans. Indian inst. Met.*, vol. 44, No. 5 (Oct. 1991), pp. 349-354.

Naito, Kunishige et al.; "The Reactions of Polythionates Kinetics of the Cleavage of Trithionate Ion in Aqueous Solutions," *J. inorg. Nucl. Chem.*, vol. 37, pp. 1453-1457. Dec. 1975.

Naito, Kunishige et al.; "The Chemical Behavior of Low Valence Sulfur Compounds. V. Decomposition and Oxidation of Terathionate in Aqueous Ammonia Solution," *Bulletin of the Chemical Society of Japan*, vol. 43, pp. 1372-1376. Dec. 1970.

Naito, Kunishige et al.; "The Chemical Behavior of Low Valence Sulfur Compounds. III. Production of Ammonium Sulfamate by the Oxidation of Ammonium Thiosulfate," *Bulletin of the Chemical Society of Japan*, vol. 43, pp. 1365-1372. Dec. 1970.

Nicol, M.J. et al.; "Recovery of Gold from Thiosulfate Solutions and Pulps with Ion-Exchange Resins"; presented at TMS Annual Meeting, New Orleans, LA Feb. 11-15, 2001.

Niinae, M. et al.; "Preferential Leaching of Cobalt, Nickel and Copper from Cobalt-rich Ferromanganese Crusts with Ammoniacal Solutions using Ammonium Thiosulfate and Ammonium Sulfite as Reducing Agent," *Hydrometallurgy*, vol. 40, pp. 111-121. Dec. 1996.

No Author; "And So Does a Novel Lixiviant," *Chemical Engineering*, vol. 102, No. 3 (Mar. 1995), p. 25.

No Author; "Gold Extraction Method Offers Companies an Alternative to Cyanide"; *JOM: The Journal of the Minerals, Metals & Materials Society*, vol. 46(11) (Nov. 1994), p. 4.

Nord, Gwyneth et al.; "The Oxidation of Thiosulfate by the Tretramminegold (III) ion in Aqueous Solution," *Acta Chemica Scandinavica*, A 29, pp. 505-512. Dec. 1975.

Osaka, T. et al.; "Electrodeposition of Soft Gold from a Thiosulfate-Sulfite Bath for Electronics Applications," *J. Electrochem. Soc.*, vol. 144, No. 10 (Oct. 1997), pp. 3462-3469.

Panayotov, V.T.; "A Technology for Thiosulphate Leaching of Au and Ag from Pyrite Concentrates," Changing Scopes in Mineral Processing: proceedings of the 6th International Mineral Processing Symposium, Kusadasi, Turkey, Sep. 24-26, 1996, pp. 563-565.

Pedraza, A.M. et al.; "Electro-Oxidation of Thiosulphate Ion on Gold-study by Means of Cyclic Voltammetry and Auger Electron Spectroscopy," *J. Electroanal. Chem.*, 250, pp. 443-449. Dec. 1988.

Rolia, E. et al.; "Effect of pH and Retention Time on the Degradation of Thiosalts," CANMET Mineral Sciences Laboratories Report MRP/MSL 79-8 (TR) (Jan. 1979), pp. 1-16.

Rolia, E. et al.; "Oxidation of Thiosalts by $SO_2$ Plus Air, Charcoal Plus Air, and Chlorine," CANMET Mineral Sciences Laboratories Report MRP/MSL 79-85 (TR) (Jun. 1979), p. 8-12.

Rolia, E. et al.; "The Kinetics of Decomposition of Tetrathionate, Trithionate and Thiosulphate in Alkaline Media," CANMET Mineral Sciences Laboratories Division Report MRP/MSL 81-33 (J) Draft (Mar. 1981), pp. 1-34.

Rolia, E. et al.; The Oxidation of Thiosulphate by Hydrogen Peroxide in Alkaline Solution, CANMET Mineral Sciences Laboratories Division Report MRP/MSL 84/84 (TR) (Jul. 1984), pp. 1-14.

Rolia, E. et al.; "Oxidation of Thiosalts with Hydrogen Peroxide," CANMET Mineral Sciences Laboratories Division Report MRP/MSL 84-144 (TR) (May 1984), pp. 1-26.

Rolia, E.; "The Kinetics of Decomposition of Thiosalts by Metallic Iron," CANMET Mineral Sciences Laboratories Division Report MRP/MSL 81-75 (TR) (Jun. 1981), pp. 1-19.

Rolia, E.; "The Oxidation of Thiosalts in Strongly Alkaline Media," CANMET Mineral Sciences Laboratories Division Report MRP/MSL 81-132 (TR) (Nov. 1981), p. 28.

Rolia, E.; "The Kinetics of Decomposition of Tetrathionate, Trithionate and Thiosulphate in Alkaline Solution," A Thesis submitted to the School of Graduate Studies in partial fulfillment of the requirements for the Degree of Master of Science Carleton University, Sep. 1981, pp. 1-170.

Rolia, Ernest et al.; "Kinetics of Decomposition of Tetrathionate, Trithionate and Thiosulfate in Alkaline Media," *Environ. Sci. Technol.*, vol. 16, No. 12, pp. 852-857. Dec. 1982.

Schippers, Axel et al., "Bacterial Leaching of Metal Sulfides Proceeds by Two Indirect Mechanisms via Thiosulfate or via Polysulfides and Sulfur," *Applied and Environmental Microbiology* (Jan. 1999), pp. 319-321.

Schmitz, P. A., "Ammoniacal thiosulfate and sodium cyanide leaching of preg-robbing Goldstrike ore carbonaceous matter," *Hydrometalluygy*, vol. 60, pp. 25-40. Dec. 2001.

Siu, Tung et al.; "Kinetics of Reaction of Sulfide with Thiosulfate in Aqueous Solution," *Ind. Eng. Chem. Res.*, vol. 38, pp. 1306-1309. Dec. 1999.

Smith, C.W. et al., "Aqueous Solution Chemistry of Polythionates and Thiosulphate: A Review of Formation and Degradation Pathways," CANMET Mineral Sciences Laboratories Report MRP/MSL 76-223 (LS) (Aug. 1976), pp. 1-29.

Steudel, Ralf et al., "The Molecular Nature of the Hydrophilic Sulfur Prepared from Aqueous Sulfide and Sulfite (Selmi Sulfur Sol)," *Z. Naturforsch.* 44b, pp. 526-530. Dec. 1989.

Sullivan, Anne M. et al., "The Autocatalytic Deposition of Gold in Nonalkaline, Gold Thiosulfate Electroless Bath," *J. Electrochem. Soc.*, vol. 142, No. 7 (Jul. 1995), pp. 2250-2255.

Tao, Jiang et al.; "Self-Catalytic Leaching of Gold . . . ," *Nonferrous Metals*, vol. 44, No. 2, pp. 30-39. Dec. 1992.

Tao, Jiang et al.; "A Kinetic Study of Gold Leaching with Thiosulfate," Hydrometallurgy, Fundamentals, Technology and Innovations, AIME, Chapter 7, pp. 119-126. Dec. 1993.

Tao, Jiang et al.; "Electrochemistry and Mechanism of Leaching Gold with Ammoniacal Thiosulphate"; Proceedings of XVIII International Mineral Processing Congress, Sydney, Australia, May 23-28, 1993, pp. 1141-1146.

Tao, Jiang et al.; "Regularities of Thiosulfate Consumption and Leaching of Copper-Bearing Gold Ore," *Mining and Metallurgical Engineering*, vol. 16, No. 1 (Mar. 1996), pp. 46-48.

Tao, Jiang et al.; "Gold and Silver Extraction by Ammoniacal Thiosulfate Catalytical Leaching at Ambient Temperature," Proceedings of the first International Conference on Modern Process Mineralogy and Mineral Processing held in Beijing, China, Sep. 22-25, 1992, pp. 648-653.

Tao, Jiang et al.; "Anodic Oxidation of Thiosulfate Ions in Gold Leaching," *J. Cent. South Univ. Technol.*, vol. 4, No. 2 (Nov. 1997), pp. 89-91.

Ter-Arakelyan, K.A. et al.; "Technological Expediency of Sodium Thiosulphate for the Extraction of Gold from Ores," *Soviet Non-Ferrous Metals Research*, vol. 12, No. 5, pp. 393-397. Dec. 1984.

Ter-Arakelyan, K.A. et al.; "Sodium Thiosulfate En Extraction of, " *Izvestiia Vysshikh Uchebnykh Zavedenil Tsvetnaia Metallurgiia*, vol. ISS 5, pp. 72-76. Dec. 1984.

Tozawa, K. et al., "Dissolution of Gold in Ammoniacal Thiosulfate Solution," TMS Paper Selection, published by The Metallurgical Society of AIME, A81-25. No Date.

Tykodi, R.J.; "In Praise of Thiosulfate," *Journal of Chemical Education*, vol. 68, pp. 146-149. Dec. 1990.

Umetsu, Yoshiyuki et al.; "Dissolution of Gold in Ammoniacal Sodium Thiosulfate Solution," AIME World Lead-Zinc Symposium, vol. II, pp. 97-104. Dec. 1970.

Vandeputte, S. et al.; "Influence of the Sodium Nitrate Content on the Rate of the Electrodeposition of Silver from Thiosulphate Solutions," *Electrochimica Acta.*, vol. 42, Nos. 23-24, pp. 3429-3441. Dec. 1997.

Von Michaelis, Hans et al.; "The Prospects for Alternative Leach Reagents-Can Precious metals Producers Get Along With Cyanide?" *Engineering and Mining Journal*, vol. 188 (Jun. 1987), pp. 42-47.

Wan, R.Y. et al.; "Thiosulfate Leaching Following Biooxidation Pretreatment for Gold Recovery from Refractory Carbonaceous-Sulfidic Ore," *Mining Engineering*, (Aug. 1997), pp. 76-80.

Wan, R.Y.; "Importance of Solution Chemistry for Thiosulphate Leaching of Gold," Presented at the World Gold '97 Conference in Singapore, Sep. 1-3, 1997, pp. 159-162.

Wan, Rong Yu et al.; "Research and Development Activities for the Recovery of Gold from Noncyanide Solutions," *Hydrometallurgy Fundamentals, Technology and Innovation* (J.B. Hisky & G.W. Warren, Eds.), pp. 415-436. Dec. 1993.

Wang, Xiang-Huai; "Thermodynamic Equilibrium Calculations on Au/Ag-Lixiviant Systems Relevant to Gold Extraction from Complex Ores," Proceedings of the Third International Symposium on Electrochemistry in Mineral and Metal Processing III, pp. 452-477. Dec. 1982.

Wang, Xiaoping et al.; "A Novel Gold Electroplating System: Gold (I)-Iodide-Thiosulfate," *J. Electrochem. Soc.*, vol. 145, No. 3 (Mar. 1998).

Webster, J.G.; "Thiosulphate Complexing of Gold and Silver During the Oxidation of a Sulphide-Bearing Carbonate Lode System, Upper Ridges Mine, P.N.G.," The Aus. I.M.M. Perth and Kaigoorlie Branches, Regional Conference on Gold-Mining Metallurgy and Geology, Oct. 1984, pp. 437-445.

Wenge, Zhang et al.; "Studies on Leaching Gold and Silver from Gold Concentrates and Silver Pyrites Associated with Complex Metals Sulphides by Ammoniacal Thiosulfate" (published in Chinese); *Non Ferrous Metals*, vol. 39, No. 4 (Nov. 1987), pp. 71-76.

Wentzien, Susanne et al.; "Thiosulfate and Tetrathionate Degradation as well as Biofilm Generation by *Thiobacillus intermedius* and *Thiobacillus versutus* Studied by Microcalorimetry, HPLC, and Ion-pair Chromatography," *Arch Microbiol*, vol. 161; pp. 116-125. Dec. 1994.

Yen, W.T. et al.; "Development in Percolation Leaching with Ammonium Thiosulfate for Gold Extraction of a Mild Refractory Ore," EPD Congress 1999, The Minerals, Metals & Materials Society, 1999, Paper at the TMS, Mar. 1-3, 1999, held in San Diego, CA, pp. 441-455.

Yen, Wan-Tai et al.; "Gold Extraction from Mildly Refractory Ore Using Ammonium Thiosulphate," International Symposium of Gold Recovery, May 4-7, 1998, Montreal, Quebec, Canada.

Yokosuka, Futoshi et al.; "Chemical Behaviour of Low-Valent Sulfur Compounds XII Oxidation of Sodium Thiosulfate with Hydrogen Peroxide and Sodium Hypochloride," *Journal of the Japan Chemistry Society*, vol. 11, pp. 1901-1909. Dec. 1975.

Xinzhe, Lan et al.; "Recovery of Gold by Thiosulfate and LSSS," Proceedings of the twenty-first International Precious Metals Conference held in San Francisco, California, p. 185. Dec. 1997.

Zhang, Jian et al.; "Leaching Gold and Silver by Lime-Sulphur-Synthetic-Solution (LSSS)," *Xian. Inst. Metall. Constr. Eng.*, vol. 16, pp. 389-393. Dec. 1992.

Zhang, Yun et al.; "Gold Extraction by Ammoniacal Thiosulfate Leaching from the Roasted Copper-Bearing Sulphureous Gold Concentrate," Huangjin Bianjibu, vol. 20, No. 7, pp. 32-35. Dec. 1999.

Zhao, Jin et al.; "Gold Extraction from Thiosulfate Solutions Using Mixed Amines," *Solvent Extraction and Ion Exchange*, vol. 16, No. 6, pp. 1407-1420. Dec. 1998.

Zhao, Jin et al.; "Extraction of gold from thiosulfate solutions with alkyl phosphorus esters"; *Hydrometallurgy*, vol. 46 pp. 363-372. Dec. 1997.

Zhao, Jin et al.; "Extraction of gold from thiosulfate solutions using amine mixed with neutral donor reagents"; *Hydrometallurgy*, vol. 48, pp. 133-144. Dec. 1998.

Zhongmin, Yang et al.; "Leaching Gold from Refractory Gold Ore Bearing Arsenic by Thiosulfate Process," *Journal of Yunnan University*, vol. 19, No. 5, pp. 508-514. Dec. 1997.

Zhu, Guocal et al.; "Oxidation Kinetics of Thiosulfate and Polysulfide Mixture," *Engineering Chemistry & Metallurgy*, vol. 17, No. 1, pp. 26-31. Dec. 1996.

Zhu, Guocal et al.; "Electrochemical Studies on the Mechanism of Gold Dissolution in Thiosulfate Solutions," *Transactions of NFsoc*, vol. 4, No. 1, pp. 50-53. Dec. 1991.

Zhuchkov, I.A. et al.; "Copper Sulfide Dissolution Kinetics in Thio . . . "; *Izvestiia Vysshikh Uchebnykh Zavedenii Tsvetnaia Metallurgiia*, vol. ISS 5-6, pp. 56-62. Dec. 1992.

Zipperian, D. et al.; "Gold and Silver Extraction by Ammoniacal Thiosulfate Leaching from a Rhyolite Ore," *Hydrometallurgy*, vol. 19, pp. 361-375. Dec. 1988.

* cited by examiner

METHOD FOR THIOSULFATE LEACHING OF PRECIOUS METAL-CONTAINING MATERIALS

CROSS REFERENCE TO RELATED APPLICATION

The present application claims priority from U.S. Provisional Application Ser. No. 60/205,472, filed May 19, 2000, which is incorporated herein by this reference this application is also a divisional of U.S. application Ser. No. 09/852,699, filed on May 11, 2001, now U.S. Pat. No. 6,660,059.

FIELD OF THE INVENTION

The present invention is directed generally to the recovery of precious metals from precious metal-containing material and specifically to the recovery of precious metals from precious metal-containing material using thiosulfate lixiviants.

BACKGROUND OF THE INVENTION

A traditional technique for recovering precious metal(s) from precious metal-containing ore is by leaching the material with a cyanide lixiviant. As used herein, a "precious metal" refers to gold, silver, and the platinum group metals (e.g., platinum, palladium, ruthenium, rhodium, osmium, and iridium). Many countries are placing severe limitations on the use of cyanide due to the deleterious effects of cyanide on the environment. Incidents of fish and other wildlife having been killed by the leakage of cyanide into waterways have been reported. The limitations being placed on cyanide use have increased substantially the cost of extracting precious metal(s) from ore, thereby decreasing precious metal reserves in many countries. Cyanide is also unable to recover precious metals such as gold from refractory ores without a pretreatment step. "Refractory ores" refer to those ores that do not respond well to conventional cyanide leaching. Examples of refractory ores include sulfidic ores (where at least some of the precious metals are locked up in the sulfide matrix), carbonaceous ores (where the precious metal complex dissolved in the lixiviant adsorbs onto carbonaceous matter in the ores), and sulfidic and carbonaceous ores.

Thiosulfate has been actively considered as a replacement for cyanide. Thiosulfate is relatively inexpensive and is far less harmful to the environment than cyanide. Thiosulfate has also been shown to be effective in recovering precious metals from pretreated refractory preg-robbing carbonaceous ores and sulfidic ores. As used herein, "preg-robbing" is any material that interacts with (e.g., adsorbs or binds) precious metals after dissolution by a lixiviant, thereby interfering with precious metal extraction, and "carbonaceous material" is any material that includes one or more carbon-containing compounds, such as humic acid, graphite, bitumins and asphaltic compounds.

Where gold is the precious metal, thiosulfate leaching techniques have typically relied on the use of copper ions to catalyze and accelerate the oxidation of gold, ammonia to facilitate the formation and stabilization of cupric ammine ions and/or a pH at pH 9 or above to maintain a region of stability where both the cupric ammine and gold thiosulfate complexes are stable.

It is well known in the art that the catalytic effect of copper and ammonia in conventional thiosulfate leaching of gold is described by the following sequence of reactions.

Formation of the Cupric Ammine Complex:

$$Cu^{2+} + 4NH_3 \rightarrow Cu(NH_3)_4^{2+} \quad (1)$$

Oxidation of gold by cupric ammine, gold complexation as the gold-thiosulfate anion, and reduction of the cupric ammine to cuprous thiosulfate:

$$Au + Cu(NH_3)_4^{2+} + 5S_2O_3^{2-} \rightarrow Au(S_2O_3)_2^{3-} + Cu(S_2O_3)_3^{5-} + 4NH_3 \quad (2)$$

Oxidation of the cuprous thiosulfate back to cupric ammine with oxygen:

$$Cu(S_2O_3)_3^{5-} + 4NH_3 + \tfrac{1}{4}O_2 + \tfrac{1}{2}H_2O \rightarrow Cu(NH_3)_4^{2+} + 3S_2O_3^{2-} + OH^- \quad (3)$$

Summing equations (2) and (3) yields the overall thiosulfate leach reaction for gold:

$$Au + 2S_2O_3^{2-} + \tfrac{1}{4}O_2 + H_2O \rightarrow Au(S_2O_3)_2^{3-} + OH^- \quad (4)$$

It can be seen from the above equations that copper and ammonia act as catalysts in that they are neither produced nor consumed in the overall leach reaction.

Cupper and ammonia can be a source of problems. Added copper tends to precipitate as cupric sulfide which is speculated to form a passive layer on gold, thereby inhibiting gold leaching as well as increasing copper and thiosulfate consumption:

$$Cu^{2+} + S_2O_3^{2-} + 2OH^- \rightarrow CuS + SO_4^{2-} + H_2O \quad (5)$$

Rapid oxidation of thiosulfate by cupric ammine also occurs, leading to excessive degradation and loss of thiosulfate:

$$2Cu(NH_3)_4^{2+} + 8S_2O_3^{2-} \rightarrow 2Cu(S_2O_3)_3^{5-} + S_4O_6^{2-} + 8NH_3 \quad (6)$$

Loss of ammonia by volatilization occurs readily, particularly in unsealed gas-sparged reactors operating at pH greater than 9.2, leading to excessive ammonia consumption:

$$NH_4^+ + OH^- \rightarrow NH_{3(aq)} + H_2O \rightarrow NH_{3(g)} + H_2O \quad (7)$$

Like cyanide, copper and ammonia are highly toxic to many aquatic lifeforms and are environmentally controlled substances.

Other problems encountered with thiosulfate leaching include difficulty in recovering gold out of solution as a result of the formation of polythionates, such as tetrathionate and trithionate, which adsorb competitively with gold onto adsorbents, such as resins. The formation of polythionates further increases thiosulfate consumption per unit mass of processed ore.

SUMMARY OF THE INVENTION

These and other needs have been addressed by the methodologies and systems of the present invention. The methodologies can recover precious metals from a variety of materials, including refractory carbonaceous or sulfidic ores, double refractory ores (e.g., ores containing both sulfide-locked gold and carbonaceous preg-robbing matter), oxide ores, nonrefractory sulfidic ores, and ores also containing copper minerals and other materials derived from such ores (e.g., concentrates, tailings, etc.).

In one embodiment, a thiosulfate leaching process is provided that includes one or more of the following operating parameters:

(a) an oxygen partial pressure that is preferably superatmospheric and more preferably ranges from about 4 to about 500 psia;

(b) a leach slurry pH that is preferably less than pH 9;

(c) a leach slurry that is preferably at least substantially free of (added) ammonia and more preferably contains less than 0.05M (added) ammonia such that the leach slurry has a maximum total concentration of ammonia of preferably less than 0.05M and more preferably no more than about 0.025M;

(d) a leach slurry that is preferably at least substantially free of (added) copper ion and more preferably contains no more than about 15 ppm (added) copper ions;

(e) an (added) sulfite concentration that is preferably no more than about 0.01M such that the slurry has a maximum total concentration of sulfite of preferably no more than about 0.02M and more preferably no more than about 0.01M; and/or (f) a leach slurry temperature preferably ranging from about 20 to about 100° C. and more preferably from about 20 to about 80° C.

The foregoing parameters can yield a high level of precious metal extraction from the precious metal-containing material, which can be at least about 70% and sometimes at least about 80%.

The thiosulfate lixiviant can be derived from any suitable form(s) of thiosulfate, such as sodium thiosulfate, calcium thiosulfate, potassium thiosulfate and/or ammonium thiosulfate. Sodium and/or calcium thiosulfate are preferred.

The leaching process can be conducted by any suitable technique. For example, the leaching can be conducted in situ, in a heap or in an open or sealed vessel. It is particularly preferred that the leaching be conducted in an agitated, multi-compartment reactor such as an autoclave.

The precious metal can be recovered from the pregnant leach solution by any suitable technique. By way of example, the precious metal can be recovered by resin adsorbtion methods such as resin-in-pulp, resin-in-solution, and resin-in-leach or by solvent extraction, cementation, electrolysis, precipitation, and/or combinations of two or more of these techniques.

Reducing or eliminating the need to have copper ions and/or ammonia present in the leach as practiced in the present invention can provide significant multiple benefits. First, the cost of having to add copper and ammonia reagents to the process can be reduced significantly or eliminated. Second, environmental concerns relating to the presence of potentially harmful amounts of copper and ammonia in the tailings or other waste streams generated by the process can be mitigated. Third, the near-absence or complete absence of copper and ammonia in the leach can provide for a much more reliable and robust leaching process, yielding more stable leachates, able to operate over a wider pH and oxidation-reduction potential (ORP) range than is possible with conventional thiosulfate leaching. The latter process must operate in the relatively narrow window of pH and ORP where both the cupric ammine complex and the gold thiosulfate complex co-exist. With the process of the present invention, the pH of the thiosulfate lixiviant solution in the leaching step can be less than pH 9 and the ORP less than 200 mV (referenced to the standard hydrogen electrode). Fourth, minimizing the amount of copper in the system can lead to increased loading of gold onto resins due to reduced competitive adsorption of copper ions. Resin elutions are also simplified as little, if any copper, is on the resin. Finally, the near-absence or complete absence of copper and ammonia in the leach can reduce or eliminate entirely a host of deleterious side reactions that consume thiosulfate and are otherwise difficult or impossible to prevent.

The elimination or near elimination of sulfite from the thiosulfate leach also can have advantages. Sulfite can depress the rate of dissolution of precious metal from the precious metal-containing material by reducing significantly the oxidation reduction potential (ORP) of the leach solution or lixiviant. As will be appreciated, the rate of oxidation of the gold (and therefore the rate of dissolution of the gold) is directly dependent on the ORP.

In another embodiment, an extraction agent is preferably contacted with a pregnant (precious metal-containing) thiosulfate leach solution at a temperature of less than about 70° C. and more preferably less than about 60° C. in the substantial absence of dissolved molecular oxygen to isolate the precious metal and convert polythionates in the pregnant leach-solution into thiosulfate. In one configuration, the extraction agent is an adsorbent, such as a resin, which loads the precious metal onto the adsorbent As used herein, an "adsorbent" is a substance which has the ability to hold molecules or atoms of other substances on its surface. Examples of suitable resin adsorbents include weak and strong base resins such as "DOWEX 21K", manufactured by Dow Chemical. In another configuration, the extraction agent is a solvent extraction reagent that extracts the precious metals into an organic phase, from which the precious metals can be later recovered. As will be appreciated, the detrimental polythionates decompose into thiosulfate in the substantial absence of dissolved molecular oxygen.

In yet another embodiment, the pregnant leach solution from a thiosulfate leaching step is contacted, after the leaching step, with a reagent to convert at least about 50% and typically at least most of polythionates (particularly trithionate and tetrathionate) into thiosulfate. The reagent or reductant can be any suitable reactant to convert polythionates into thiosulfate, with any sulfide, and/or polysulfide (i.e., a compound containing one or a mixture of polymeric ion(s) $S_x^{2-}$, where x=2–6, such as disulfide, trisulfide, tetrasulfide, pentasulfide and hexasulfide) being particularly preferred. A sulfite reagent can also be used but is generally effective only in converting polythionates of the form $S_xO_6^{2-}$, where x=4 to 6, to thiosulfate. The sulfite, sulfide, and/or polysulfide can be compounded with any cation, with Groups IA and IIA elements of the Periodic Table, ammonium, and hydrogen being preferred.

In yet another embodiment, a precious metal solubilized in a solution, such as a pregnant leach solution or eluate, is electrowon in the presence of sulfite. In the presence of sulfite, the precious metal is reduced to the elemental state at the cathode while the sulfite is oxidized to sulfate at the anode. Sulfite is also believed to improve the precious metal loading capacity of the resin by converting loaded tetrathionate to trithionate and thiosulfate.

In yet another embodiment, the formation of polythionates is controlled by maintaining a (pregnant or barren) thiosulfate leach solution in a nonoxidizing (or at least substantially nonoxidizing) atmosphere and/or sparging a nonoxidizing (or at least substantially nonoxidizing) gas through the leach solution. As will be appreciated, the atmosphere or gas may contain one or more reductants, such as hydrogen sulfide and/or sulfur dioxide. The molecular oxygen concentration in the atmosphere and/or sparge gas is preferably insufficient to cause a dissolved molecular oxygen concentration in the leach solution of more than about 1 ppm and preferably of more than about 0.2 ppm. Preferably, the inert atmosphere (or sparge gas) is at least substantially free of molecular oxygen and includes at least about 85 vol. % of any inert gas such as molecular nitrogen and/or argon. By controlling the amount of oxidant(s) (other than thiosulfate and polythionates) in the atmosphere and/or (pregnant or barren) leach solution the rate or degree of oxidation of thiosulfates to form polythionates can be controlled.

DETAILED DESCRIPTION

The present invention provides an improved thiosulfate leaching process for the recovery of precious metals from precious metal-bearing material. The precious metal(s) can be associated with nonprecious metals, such as base metals, e.g., copper, nickel, and cobalt. The precious metal-bearing material includes ore, concentrates, tailings, recycled industrial matter, spoil, or waste and mixtures thereof. The invention is particularly effective for recovering precious metals, particularly gold, from refractory carbonaceous material.

Figure 1:
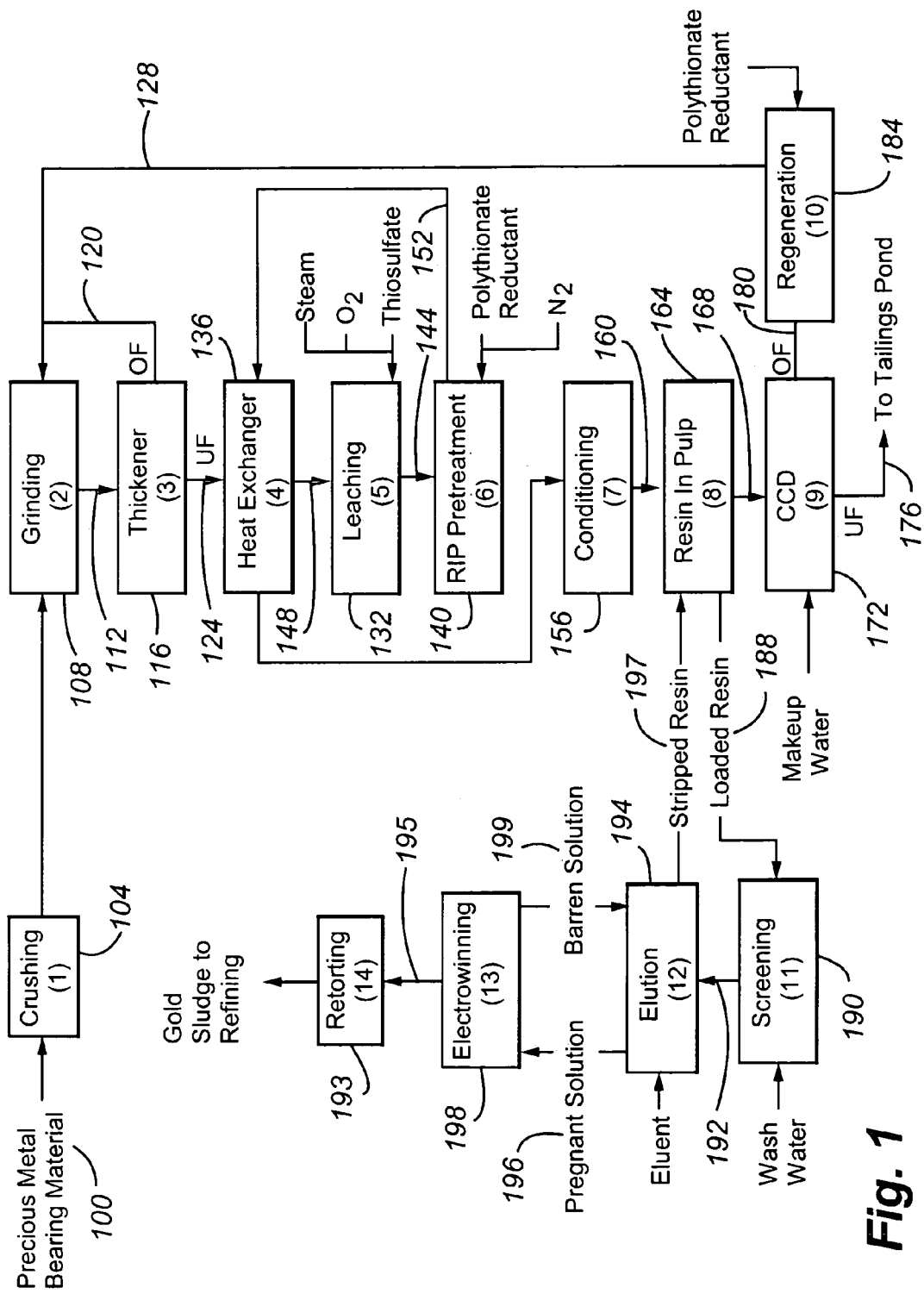
FIG. 1 is a flow schematic of a first embodiment of the present invention.

FIG. 1 is a flow chart according to a first embodiment of the present invention. The process of the flow chart is particularly effective in recovering gold from carbonaceous material and oxide material and mixtures thereof.

Referring to FIG. 1, a precious metal-bearing material 100 is subjected to the steps of wet and/or dry crushing 104 and wet and/or dry grinding 108 to reduce the particle size of the material sufficiently to enable the solids to be suspended in an agitated vessel and to allow for the efficient leaching of the precious metals. Preferably, wet grinding is employed with the recycled thiosulfate leach solution and water being used as the liquid component in the slurry. In that event, the slurry 112 containing the comminuted material typically contains from about 0.05 to about 0.1M thiosulfates and from about 0.0005 to about 0.025 M polythionates. The fully comminuted material particle size is preferably at least smaller than 80% passing about 48 mesh (300 microns), more preferably 80% passing about 100 mesh (150 microns), and most preferably 80% passing about 200 mesh (75 microns). The typical solids content of the slurry 112 ranges from about 20 to about 30 wt. %. As will be appreciated, other techniques can be used to comminute the material to the desired particle size(s). By way of illustration, blasting can be used alone with or without crushing and grinding and crushing and grinding can be used alone with or without another comminution technique.

The ground slurry 112 is then thickened 116 to adjust the pulp density to a value suitable for leaching. The ideal leach pulp density will vary according to the type of material being leached. Typically, the pulp density ranges from about 20 to about 50% solids by weight, but could be as low as about 1% or as high as about 60%. Thickening 116 will generally not be required if the desired pulp density (after wet comminution or formation of the comminuted material into a slurry) is less than about 20%.

The thickener overflow solution 120 is recycled back to grinding 108 in the event that wet grinding is employed. Otherwise, the overflow solution 120 is returned to the optional slurry formation step (not shown).

Fresh makeup thiosulfate is added, as necessary, at any suitable location(s), such as to the slurried material during comminution 108 and/or in the thickener 116, to the underflow or overflow solution 124, 120, to leaching 132 and/or to the regenerated thiosulfate solution 128 (discussed below). In any event, the optimum solution thiosulfate concentration to maintain during leaching 132 will depend on the nature of the material being leached, but will preferably range from about 0.005 to about 2 molar (M), more preferably about 0.02 to about 0.5M, and even more preferably from about 0.05 to about 0.2 M. The source of makeup thiosulfate can be any available thiosulfate-containing compound, such as sodium thiosulfate, potassium thiosulfate, calcium thiosulfate, or any other thiosulfate-containing material or thiosulfate precursor. Ammonium thiosulfate can also be used but its use is less preferred for environmental reasons. Alternatively, thiosulfate can be generated in situ or in a separate step by reaction of elemental sulfur with a source of hydroxyl ions, in accordance with the following reaction:

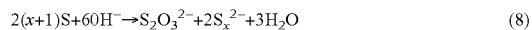

$$2(x+1)S + 6OH^- \rightarrow S_2O_3^{2-} + 2S_x^{2-} + 3H_2O \qquad (8)$$

where x=3–6, or by reaction of bisulfide with bisulfite:

$$2HS^- + 4HSO_3^- \rightarrow 3S_2O_3^{2-} + 3H_2O \qquad (9)$$

or by reaction of elemental sulfur with sulfite:

$$S + SO_3^{2-} \rightarrow S_2O_3^{2-} \qquad (10)$$

If the desirable temperature is above ambient, it may be desirable to recover waste heat for recycle to leaching. In that event, the underflow slurry 124 is directed through an indirect heat exchanger 136, preferably a shell and tube heat exchanger system in which the hot slurry from resin-in-pulp pretreatment 140 (discussed below) is passed through the inner tubes and the cold feed (or underflow) slurry 140 is passed through the annular space between the tubes (or vice versa). In this way waste heat is transferred from the leached slurry 144 to the feed (or underflow) slurry 124, reducing the amount of new heat that must be added in leaching 132 to maintain the desired leach temperature. Typically, the approach temperature of the incoming feed slurry 148 is from about 2 to about 5° C. below the leach temperature (discussed below) and heat is added to the leach vessel by suitable techniques to makeup the difference.

The heated slurry 148 is subjected to leaching 132 in the presence of oxygen and thiosulfate. Leaching is conducted in the presence of an oxygen-enriched atmosphere at atmospheric pressure, or at a pressure above atmospheric pressure using an oxygen-containing gas to reduce or eliminate the need for the presence of copper and/or ammonia in the leach. Using gold as an example, the thiosulfate leaching of precious metal-bearing material in the absence or substantial absence of copper and ammonia under elevated oxygen partial pressure can be illustrated by the following reaction:

$$Au + 2S_2O_3^{2-} + \frac{1}{4}O_2 + \frac{1}{2}H_2O \rightarrow Au(S_2O_3)_2^{3-} + OH^- \quad (11)$$

The increased oxygen partial pressure in the leach increases the rate of the above reaction in the absence or near absence of copper and ammonia. To accomplish this goal, the oxygen-containing gas may include atmospheric air, or it may include relatively pure (95%+) oxygen such as that produced from any commercially available oxygen plant, or it may include any other available source of oxygen. The desired oxygen partial pressure (PO$_2$) maintained during leaching will depend on the material being leached, but it will be at least higher than that provided under normal ambient conditions by air at the elevation the process is applied. Thus, if the process is practiced at sea level for example the oxygen partial pressure will be in excess of about 3 pounds per square inch absolute pressure (psia) to as high as about 500 psia, preferably from about 10 to about 115 psia, and most preferably from about 15 to about 65 psia. The total operating pressure is the sum of the molecular oxygen partial pressure and the water vapor pressure at the temperature employed in the leaching step 132, or preferably ranges from about 15 to about 600 psia and more preferably from about 15 to about 130 psia.

The leaching temperature will be dictated by the type of material being leached. The temperature will vary typically from about 5° C. to about 150° C., preferably from about 20 to about 100° C., and most preferably from about 40 to about 80° C. Higher temperatures accelerate the leaching of precious metals but also accelerate the degradation of thiosulfate. If required, a source of makeup heat such as steam is added to the leach reactors to maintain the desired temperature.

The leaching retention time is dependent on the material being leached and the temperature, and will range from about 1 hour to 96 hours, preferably from about 2 to about 16 hours, and most preferably from about 4 to about 8 hours.

The absence or substantial absence of copper and/or ammonia in the leach greatly simplifies the process. Elimination or near-elimination of ammonia and copper from the leach provides the advantage of allowing for a consistently high and reproducible precious metal extraction over a broader pH range than was previously possible with the other thiosulfate leaching processes. Preferably, the (added and/or total solution) copper concentration is no more than about 20 ppm, more preferably no more than about 15 ppm, and even more preferably no more than about 10 ppm while the (added and/or total solution) ammonia concentration is no more than about 0.05 M, more preferably no more than about 0.03 M, and even more preferably no more than about 0.01 M. In the present invention leaching can be operated at about pH 7–12, preferably about pH 8–11, more preferably about pH 8–10, and even more preferably at a pH less than pH9. The oxidation-reduction potential (ORP) preferably ranges from about 100 to about 350 mV and more preferably from about 150 to about 300 mV (vs. the standard hydrogen electrode (SHE)).

Oxidative degradation of thiosulfate ultimately to sulfate can also occur, possibly by the following sequence of reactions that involve the formation of intermediate polythionates (polythionates can be represented by $S_nO_6^{2-}$, where n=2–6):

$$\text{Tetrathionate formation: } 2S_2O_3^{2-} + \frac{1}{2}O_2 + H_2O \rightarrow S_4O_6^{2-} + 2OH^- \quad (12)$$

$$\text{Trithionate formation: } 3S_4O_6^{2-} + \frac{5}{2}O_2 + H_2O \rightarrow 4S_3O_6^{2-} + 2H^+ \quad (13)$$

$$\text{Sulfite formation: } S_3O_6^{2-} + \frac{1}{2}O_2 + 2H_2O \rightarrow 3SO_3^{2-} + 4H^+ \quad (14)$$

$$\text{Sulfate formation: } 2SO_3^{2-} + O_2 \rightarrow 2SO_4^{2-} \quad (15)$$

$$\text{Overall: } S_2O_3^{2-} + 2O_2 + H_2O \rightarrow 2SO_4^{2-} + 2H^+ \quad (16)$$

Oxidative degradation of thiosulfate to polythionates and sulfates is accelerated markedly in the presence of copper ions and/or ammonia. The oxidative degradation reactions are slowed considerably at elevated oxygen partial pressure in the absence or near-absence of copper and ammonia.

The leaching step 132 may be conducted in a batch or continuous basis but continuous operation is preferred. Continuous leaching is carried out in a multiple series of one or more reactors that are agitated sufficiently to maintain the solids in suspension. Agitation may be accomplished by mechanical, pneumatic or other means. In a preferred configuration, gassing impellers are employed, such as those disclosed in U.S. Pat. No. 6,183,706 and copending U.S. patent application Ser. No. 09/561,256, filed Apr. 27, 2000, which are incorporated herein by reference. Such impellers can significantly enhance the amount of dissolved molecular oxygen in the leach solution. Leaching may also be carried out in a multi-compartment autoclave containing one or more compartments, (with 4 to 6 compartments being preferred) similar in design to the autoclaves used to pressure oxidize sulfide-bearing ores or concentrates. However, owing to the non-acidic, moderate temperature, relatively mild conditions employed in the present invention, the autoclave materials of construction are much less expensive than those found to be necessary when oxidizing sulfide minerals. The latter autoclaves are normally constructed of a steel shell fitted with a lead liner and refractory brick liner and containing metallic components constructed of titanium or other expensive corrosion-resistant alloys. The leach reactors and contained metallic components employed by the present invention can be simply constructed of stainless steel and do not require lead or brick liners.

The extraction of precious metals in the leaching step 132 is relatively high, particularly for carbonaceous ores. Typically, at least about 50%, more typically at least about 70%, and even more typically at least about 80% of the precious metal in the precious metal-containing material is extracted or solubilized into the pregnant leach solution 144. The concentration of the dissolved precious metal in the pregnant leach solution typically ranges from about 0.05 to about 100 ppm and more typically from about 1 to about 50 ppm.

The pregnant leach slurry 144 containing the precious metal-bearing leach solution and gold-depleted solid residue may optionally be directed to RIP pretreatment 140 to reduce the concentration of polythionates in solution. As will be appreciated, the molecular oxygen sparged through the leach slurry in the leaching step 132 will oxidize a minor portion of the thiosulfate into polythionates. Polythionates have the undesired effect of reducing the loading of precious metals on to resin by competitive adsorption. Lowering the polythionate concentration will have the beneficial effect of increasing the loading of precious metals on to resin, thereby improving the efficiency of resin recovery of precious metals.

The RIP pretreatment step 140 can be performed using any one or more of a number of techniques for converting polythionates to other compounds that do not compete with the precious metal for collection by the extraction agent.

In one embodiment, a polythionate reductant is added to the slurry 144 to reduce polythionates to thiosulfates. Any of a number of reductants are suitable for performing the conversion.

By way of example, a sulfide-containing reagent can reduce the polythionates back to thiosulfate, as shown by the following reactions:

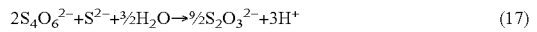

$$2S_4O_6^{2-}+S^{2-}+3/2H_2O\rightarrow 9/2S_2O_3^{2-}+3H^+ \quad (17)$$

$$S_3O_6^{2-}+S^{2-}\rightarrow 2S_2O_3^{2-} \quad (18)$$

Any reagent that releases sulfide ions on dissolution will suffice, such as sodium bisulfide, NaHS, sodium sulfide, $Na_2S$, hydrogen sulfide gas, $H_2S$, or a polysulfide. The use of a sulfide reagent has the advantages of rapidly and efficiently reducing polythionates to thiosulfate at ambient or moderately elevated temperature. The treatment can be carried out in an agitated reactor in batch mode or in a series of 1–4 reactors operating in continuous mode, or in a multi-compartment autoclave. Alternatively the treatment can be carried out in a pipe reactor or simply by injecting sulfide ions in the piping system directing the leach slurry to gold recovery, or the first stage of RIP. The treatment is carried out at a controlled pH of about pH 5.5 to about pH 10.5, preferably about pH 7 to about pH 10, most preferably less than about pH 9. The temperature employed can range from about 20° C. to about 150° C., preferably from about 40 to about 100° C., more preferably from about 40 to about 80° C., and even more preferably from about 60 to about 80° C. The retention time can range from as low as 5 minutes, preferably greater than 30 minutes, most preferably from about 1 to about 3 hours.

Alternatively, a sulfite-containing reagent can also reduce polythionates to thiosulfates as shown by the following reaction:

$$S_4O_6^{2-}+SO_3^{2-}\rightarrow S_2O_3^{2-}+S_3O_6^{2-} \quad (19)$$

Sulfite treatment is effective in reducing tetrathionate quickly, but a disadvantage is it is ineffective in reducing trithionate. The sulfite can be added in any form and/or can be formed in situ. For example, sulfite can be added in the form of sodium metabisulfite or sulfur dioxide.

When using sulfite, the temperature of the leach slurry in the RIP pretreatment 140 is preferably less than 60° C. to inhibit, at least substantially, the precipitation of precious metal(s) from the leach slurry 144. More preferably, the RIP pretreatment 140 with sulfite is performed at a temperature in the range of from about 10 to about 50° C. and even more preferably at ambient temperature.

When using sulfite, the residence time of the leach slurry 144 in the regeneration step 140 is preferably at least about 1 second, more preferably greater than about 5 minutes, and even more preferably greater than about 10 minutes and no more than about 1 hour, with about 15–30 minutes being most preferable.

The pH of the leach slurry during sulfite treatment typically ranges from about pH 5.5 to about pH 10.5 and more typically from about pH 7 to about pH 10.

Other suitable polythionate reductants include hydrogen, fine, reactive elemental sulfur, carbon monoxide, and mixtures thereof.

In another embodiment, the pretreatment step 140 is performed by maintaining the temperature of the leach slurry at a sufficiently high value in the absence of oxygen to effect the following hydrolytic disproportionation reactions:

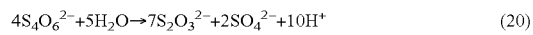

$$4S_4O_6^{2-}+5H_2O\rightarrow 7S_2O_3^{2-}+2SO_4^{2-}+10H^+ \quad (20)$$

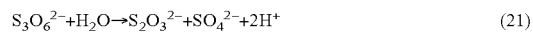

$$S_3O_6^{2-}+H_2O\rightarrow S_2O_3^{2-}+SO_4^{2-}+2H^+ \quad (21)$$

Hydrolytic treatment can be carried out in an agitated reactor in batch mode or in a series of 1–4 reactors operating in continuous mode, or a multi-compartment autoclave. The temperature is preferably maintained in the range of from about 60 to about 150° C., preferably of from about 70 to about 100° C., and most preferably of from about 80 to about 90° C. by adding a source of heat, such as steam. The retention time typically ranges from about 15 minutes to 8 hours, preferably from about 1 to about 6 hours, and most preferably from about 2 to about 4 hours. Hydrolytic treatment is generally less preferable than sulfide treatment because the former method results in irreversible loss of some of the polythionate to sulfate.

Alternatively, any or all of the above-techniques for converting polythionate(s) into thiosulfate can be combined in the same process configuration.

In a preferred embodiment, the reductant used to convert polythionates into thiosulfates is the sulfide reagent. Sulfide addition is preferred because one sulfide reacts with one tri- or two tetrathionates to form multiple thiosulfates without any sulfur-containing byproducts. Sulfite addition only reduces tetrathionate and is not capable of reducing trithionate at common operating temperatures and pH's. Heating of the leach solution is energy intensive and produces byproducts. Trithionate and tetrathionate are each converted into thiosulfate, sulfate, and hydrogen ions, thus the thiosulfate yield is not as high as with sulfide addition.

RIP pretreatment 140 can be performed in any suitable vessel(s), preferably agitated. Preferably, RIP pretreatment is performed in a series of tanks or in a multistaged vessel.

The addition of a sulfide such as NaHS is preferred. Preferably, the amount of the reductant generally and, sulfide reagent specifically added to the slurry 144 is sufficient to convert at least most of the polythionates into thiosulfate. The amount of sulfide contacted with the slurry 144 preferably is at least about 100 to about 150% of the stoichiometric amount required to convert at least substantially all of the polythionates in the slurry into thiosulfates. Typically, at least about 50%, more typically at least most, and even more typically from about 80 to about 95% of the polythionates are converted into thiosulfates in RIP pretreatment 140.

The temperature of the slurry 144 preferably is at least about 60° C. and the ORP of the exiting slurry 152 is at least below about 100 mV (SHE) and more preferably ranges from about −100 to about 100 mV (SHE) to substantially minimize precious metal precipitation.

The exiting RIP pretreated slurry 152 is passed through heat exchanger 136 and conditioned in a conditioner 156 to resolubilize any precious metal precipitated during RIP pretreatment 140 and/or heat exchange 136. Conditioning 156 is performed in an agitated single- or multi-compartment vessel which has an oxidizing atmosphere, such as air, to cause solubilization of the precious metal precipitates. Although polythionates will form in the presence of an oxidant, such as molecular oxygen, the rate of conversion of thiosulfate to polythionates is much slower than the rate of precious metal solubilization. Preferably, the residence time (at ambient temperature and pressure) is selected such that at least about 95% of the precious metal precipitates are solubilized while no more than about 5% of the thiosulfate is converted into polythionates. Preferably, the slurry residence time in conditioning 156 is no more than about 12 hrs and more preferably ranges from about 1 to about 6 hrs.

The conditioned slurry 160 is next subjected to resin-in-pulp treatment 164 to extract the precious metal from the conditioned slurry 160. The resin-in-pulp step 164 can be performed by any suitable technique with any suitable ion exchange resin. Examples of suitable techniques include that discussed in U.S. patent application Ser. No. 09/452,736, filed in June, 2000, entitled "A Process for Recovering Gold from Thiosulfate Leach Solutions and Slurries with Ion Exchange Resins", to Thomas, et al.; U.S. patent application Ser. No. 09/034,846, filed Mar. 4, 1998, entitled "Method for Recovering Gold from Refractory Carbonaceous Ores"; and U.S. Pat. Nos. 5,536,297 and 5,785,736, all of which are incorporated herein by reference. Preferred resins include anion exchange resins, preferably a strong base resin including a quaternary amine attached to a polymer backbone. A strong base resin is preferred over a weak base resin. The precious metal loading capacity of a strong base resin is typically greater than that of a weak base resin, such that a lower volume of resin is required. Gel resins and macroporous resins are suitable. Suitable resins include all commercial strong-base resins of either Type I (triethylamine functional groups) or Type II (triethyl ethanolamine functional groups). Specific strong-base ion exchange resins include "A500" manufactured by Purolite, "A600" manufactured by Purolite, "21K" manufactured by Dow Chemical, "Amberlite IRA 410" manufactured by Rohm and Haas, "Amberlite IRA 900" manufactured by Rohm and Haas, and "Vitrokele 911" supplied by Signet. Because the RIP pretreatment and resin-in-pulp steps 140 and 164 are preferably performed in the same vessel (though they may be performed in different vessels), the temperature, leach slurry pH, and residence time typically depend on which of the above techniques are used to reduce the polythionate concentration.

Resin-in-pulp treatment can be performed in any suitable vessel. A preferred vessel is a Pachuca tank, which is an air-agitated, conical bottomed vessel, with air being injected at the bottom of the cone. An advantage of the Pachuca system is reduced resin bead breakage and improved dispersion of the resin beads in the slurry as compared to mechanically agitated systems. The RIP recovery is preferably carried out in four or more tanks connected in series, more preferably between four and eight such Pachuca tanks.

During resin-in-pulp 164, the resin will become "loaded" with the dissolved precious metals. Typically, at least about 99% and more typically at least about 99.8% of the precious metal(s) in the leach slurry will be "loaded" or adsorbed onto the resin.

To inhibit the formation of polythionates and the consequent precious metal recovery problems and increased reagent consumption, the leach slurry can be maintained in an inert (or an at least substantially nonoxidizing) atmosphere and/or an inert (or an at least substantially nonoxidizing) gas can be sparged through the leach slurry. The atmosphere is preferably maintained (and/or gas sparging used) during RIP pretreatment 140 and resin-in-pulp 164. As used herein, "inert" refers to any gas which is at least substantially free of oxidants, such as molecular oxygen, that can cause thiosulfate to be converted into a polythionate. For example, an "inert" gas would include a reducing gas. Typically, the inert atmosphere will include at least about 85 vol % of an inert gas, preferably nitrogen gas, and no more than about 5 vol % oxidants, such as oxygen gas, that can cause thiosulfate conversion into a polythionate. The molecular nitrogen can be a byproduct of the oxygen plant that is employed in the leaching step to provide superatmospheric partial pressures of oxygen gas. As will be appreciated, the leach slurry 144 during transportation between the leaching and RIP pretreatment steps 132 and 140 and if applicable from the RIP pretreatment and resin-in-pulp steps 140 and 164 (except during conditioning 156) is typically in a conduit that is not open to the surrounding atmosphere. If the leach slurry is open to an atmosphere during transportation in either or both of these stages, the leach slurry should be maintained in the presence of the inert atmosphere during any such transportation.

While not wishing to be bound, it is believed that sparging is more effective than an inert atmosphere without sparging in controlling polythionate production. Sparging appears to inhibit molecular oxygen ingress into the solution, even where the reactor is open to the ambient atmosphere, because of the outflow of inert gas from the surface of the solution.

The barren leach slurry 168 (which will typically contain no more than about 0.01 ppm precious metals or 1% of the precious metal(s) in the leach solution 144) is subjected to one or more stages of counter current decantation ("CCD") 172. In CCD 172, the solids are separated in the underflow 176 from the barren leach (or overflow) solution 180 and sent to the tailings pond. The barren leach solution 180 is separated in the overflow from the solids and forwarded to regeneration step 184 to convert polythionates to thiosulfate. As will be appreciated, CCD performs liquid/solid separation, provides water balancing in the circuit, and prevents build up of impurities in the leach circuit by removing a portion of the leach solution with the solids.

Regeneration 184 can be performed in one or more vessel(s) and/or by in line sulfide (and/or sulfite) addition to a conduit carrying the stripped lixiviant solution. If a number of the techniques are employed, they can be performed simultaneously (in the same reactors) or sequentially (in different reactors), as desired.

The regenerated lixiviant solution 128 is recycled to the grinding step 108 along with the thickener overflow 120 and ultimately to the leaching step 132.

The loaded resin 188 is screened 190 and washed with water to remove any leach slurry (liquid and/or leached material) from the resin beads.

The recovered beads 192 are contacted with an eluant to strip or elute 194 adsorbed precious metal into the eluate and form a pregnant solution 196 containing typically at least most (and more typically at least about 95%) of the precious metal on the resin and a stripped resin 197.

The eluant can be any suitable eluant that can displace the adsorbed precious metal from the loaded resin beads. The eluant could include salts, such as one or more types of polythionate ions as set forth in U.S. application Ser. No. 09/452,736 above, and a nitrate, a thiocyanate, a sulfite, a thiourea, a perchlorate and mixtures thereof.

Typically, the concentration of the eluant in the pregnant solution 196 ranges from about 0.25 to about 3 M; the temperature of elution 194 from about 5 to about 70° C., and the pH of elution 194 from about pH 5 to about pH 12. Under the conditions, at least about 90% and more typically from about 95 to about 99% of the precious metal adsorbed on the resin is displaced by the eluant into the pregnant solution 196.

The stripped resin 197 is recycled to the resin-in-pulp step 164. Optionally, the stripped resin 197 can be regenerated (not shown) by known techniques prior to reuse of the resin. As will be appreciated, the resin can be regenerated by acid washing the resin with an acid such as nitric acid or hydrochloric acid. The acid wash removes adsorbed eluant and/or impurities from the resin and frees up the functional sites on the resin surface (previously occupied by the eluant) to adsorb additional precious metal. In the case of a polythionate eluant, the resin can be regenerated by contacting the resin with sulfide and/or sulfite to reduce the polythionate ions to thiosulfate ions and sulfate ions. After regeneration, the resin and regeneration product solution are separated by screening and washing.

The pregnant solution 196, which includes the eluant and typically no more than about 100 ppm and more typically from about 10 to about 500 ppm solubilized precious metals, is subjected to electrowinning 198 to recover the solubilized precious metals and form a barren solution 199. Problems in electrowinning of precious metals out of a medium containing polythionates and/or thiosulfate have been encountered in U.S. patent application Ser. No. 09/452,736. When the eluant is a polythionate the polythionate and thiosulfate tend to be co-reduced with the precious metal at the cathode to produce elemental sulfur, which interferes with the efficient continued operation of the electrowinning circuit while the polythionate and thiosulfate are also wastefully oxidized to sulfate ions at the anode.

These problems are overcome by the present invention through the use of sulfite in the pregnant solution. Sulfite is added to the eluant and/or to the pregnant solution 196 prior to, during, or after electrowinning. Preferably, sulfite is added to the eluant prior to the elution step 194. In the presence of sulfite, the precious metal is reduced at the cathode while the sulfite is oxidized to sulfate at the anode. This has the benefit of lowering the cell voltage required. Preferably, the concentration of sulfite in the pregnant solution 196 (in the elution and electrowinning steps 194, 198) is at least about 0.01M and more preferably ranges from about 0.1 to about 2 M. The sulfite is preferably in the pregnant solution with another eluant, such as any of the eluants noted above.

The stripped or barren solution 199 is removed from the electrowinning cell(s) and returned to the elution step 194. A bleedstream (not shown) of the barren solution 199 can be used to control buildup of impurities such as sulfate.

The recovered precious metal 195, which contains the precious metal recovered in electrowinning and impurities, is subjected to retorting 193 by known techniques to remove the impurities and form precious metal sludge. The sludge, which contains at least most of the precious metal in the recovered precious metal 195, is refined to produce a precious metal product of high purity.

Figure 2:
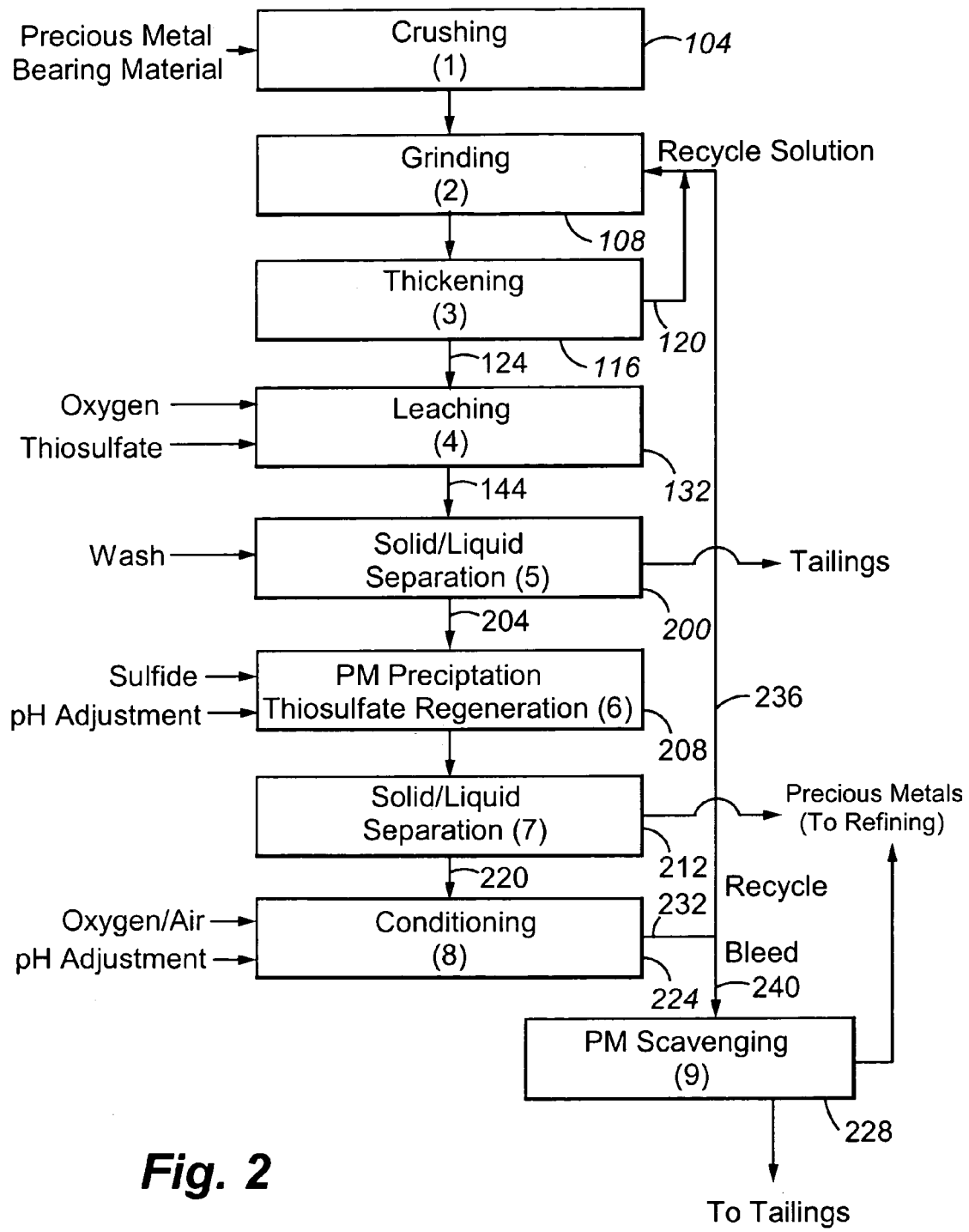
FIG. 2 is a flow schematic of second embodiment of the present invention.

FIG. 2 depicts another embodiment of a process for thiosulfate leaching of a refractory precious metal-containing material. FIG. 2 shows an alternative to resin-in-pulp for precious metal recovery. Following leaching 132, the precious metal bearing solution 144 is separated 200 from the solids by any suitable means, such as by counter-current decantation washing and/or filtration. Preferably, at least about 95% and more preferably at least about 99% of the precious metal is separated from the solids with the latter going to tailings impoundment.

The separated precious metal bearing solution 204 is directed to the precious metal precipitation—thiosulfate regeneration step 208. This process can be carried out in any suitably agitated reactor or plurality of agitated reactors. The pH of the precious metal bearing solution 204 is adjusted if necessary to about pH 5.5–12, more preferably about pH 7–11, even more preferably about pH 9–11 using a suitable basic reagent such as sodium hydroxide and the solution is contacted with a reductant, preferably a sulfide and/or bisulfide and/or polysulfide reagent to precipitate at least about 99% of the precious metal and convert at least about 90% of the polythionates to thiosulfate, effectively regenerating the thiosulfate lixiviant. The effectiveness of the conversion causes significantly less thiosulfate reagent to be consumed during the process than for conventional thiosulfate leaching processes. The use of a sulfide and/or bisulfide and/or polysulfide has the added benefit of reducing impurities such as copper or mercury or manganese from solution thereby reducing the rate of thiosulfate degradation. While not wishing to be bound by any theory, it is believed that the most likely composition of the precipitate is the metallic precious metal and/or a precious metal sulfide, such as $Au_2S$ Maximum precipitation of gold and regeneration of thiosulfate is accomplished by adding at least a stoichiometric amount of reductant (relative to the dissolved precious metal and polythionate concentrations) to reduce the solution ORP to at least about −150 mV (SHE). The temperature is preferably maintained in the range of about 5 to 40° C., and more preferably at ambient temperature, about 20° C. The retention time is about 5 minutes to about 2 hours, more preferably about 15 minutes to about 1 hour. The process is conducted under oxygen-depleted conditions, with the solution preferably containing no more than about 1 ppm dissolved molecular oxygen and more preferably less than about 0.2 ppm dissolved molecular oxygen concentration, by bubbling an oxygen-deficient gas such as nitrogen into the slurry and/or maintaining a blanket of nitrogen in the atmosphere over the slurry as noted above.

The precious metal bearing precipitate is separated from the regenerated solution 212 by any suitable method such as filtration, CCD, and the like and the separated precious metal 216 is recovered by refining in furnaces.

The regenerated solution 220 is directed to the conditioning step 224, which can be conducted in any suitably agitated reactor or plurality of reactors. The solution pH is adjusted to a value suitable for recycling the solution back to grinding 108 and/or for precious metal scavenging 228. Preferably, the pH ranges from about pH 7 to about pH 12, more preferably about pH 8 to pH 10. The solution 220 is agitated in the presence of an oxygen-containing atmosphere, such as air, to oxidize any remaining reductant (such as sulfide or bisulfide or polysulfide) carried over from the precious metal precipitation—thiosulfate regeneration step 208. The duration of the conditioning step 224 is preferably not sufficient to cause more than about 5% of the thiosulfate to form polythionates, or to yield a polythionate concentration of more than about 0.003M. The majority (typically at least about 80 vol %) of the conditioned solution 232 is then recycled in recycle solution 236.

A minor portion (e.g., from about 2 to about 20 vol %) of the conditioned solution or bleed stream 240 may have to be bled to tailings to control the buildup of impurities, such as soluble sulfate and metallic impurities. Prior to discharge to tailings the bleed portion 240 of the conditioned solution 232 is directed to the precious metal scavenging step 228 to recover any precious metals remaining in solution that were not recovered in the precious metal precipitation—thiosulfate regeneration step 208. Precious metal scavenging can be accomplished, by any suitable gold recovery technique such as by passing the bleed solution 240 through a column containing a strong base resin to adsorb the precious metal. While not wishing to be bound by any theory, precipitated precious metal can be redissolved due to trace amount of molecular oxygen in the solution and incomplete reduction of polythionates in the solution. Because the amount of polythionates in the bleed is negligible, a resin-in-column recovery technique will have an excellent ability to load any remaining dissolved precious metal.

In an alternative configuration (not shown), the precious metal precipitates are redissolved in a suitable solvent, such as nitric/hydrochloric acid, cyanide, thiosulfate, thiourea chloride/chlorine and bromide/bromine to provide a precious metal-containing solution. The precious metal can then be recovered by electrolysis as noted above in connection with step 198 of FIG. 1.

This process is preferred in certain applications over the process of FIG. 1. For certain precious metal-containing materials, it is difficult to obtain high rates of precious metal adsorption onto resins while maintaining the precious metal in solution. The use of an RIP pretreatment step, though beneficial, can be difficult to use without experiencing some precious metal precipitation. Conditioning 156 may not be completely effective in redissolving gold precipitates, which would be discarded with the barren solids to tailings. The process of FIG. 2 can also be more robust, simpler, and therefore easier to design and operate than the process of FIG. 1.

Figure 3:
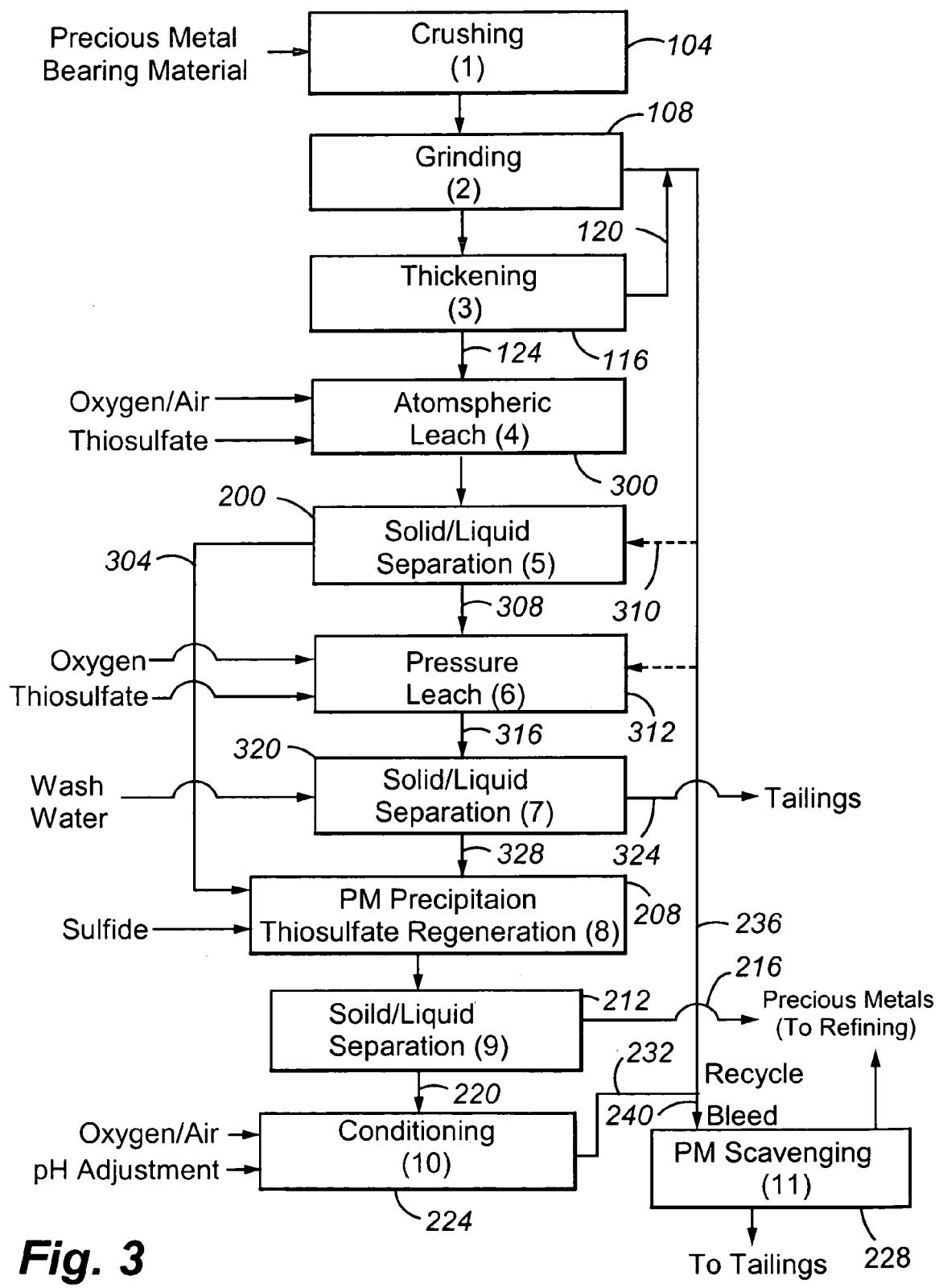
FIG. 3 is a flow schematic of a third embodiment of the present invention.

FIG. 3 shows an alternative to FIG. 2 in which thiosulfate leaching is conducted in two stages to achieve more effective recovery of the precious metal content. Leaching is first conducted at atmospheric pressure and ambient temperature in the presence of an oxygen-containing gas such as air or industrially available oxygen (step 300) to dissolve from about 30 to 95% of the leachable precious metal content. The leachable precious metal content is defined as that portion of the precious metal content that is physically accessible to the thiosulfate lixiviant and is not encapsulated within constituents contained in the host material. The precious metal bearing solution 304 is separated from the solids 308 (step 200), the solids 308 are repulped with a portion 310 of the recycle solution 236, and the resulting slurry 308 is then directed to pressure leaching (step 312) to dissolve the majority, ie. about 5–70%, of the remaining leachable precious metal content that was not recovered in atmospheric leaching 300. In pressure leaching the solids are leached under superatmospheric conditions such as the conditions described previously (step 132 of FIG. 1). The molecular oxygen partial pressure in leach 300 preferably ranges from the molecular oxygen partial pressure at ambient conditions (e.g., more than about 3 psia at sea level) to about 15 psia and the molecular oxygen partial pressure in leach 312 preferably ranges from more than 15 psia to about 500 psia. The slurry 316 exiting pressure leaching 312 is then processed in essentially the same manner as the slurry exiting leaching 300 in FIG. 2. That is, the slurry 316 is subjected to solid/liquid separation 320 in the presence of wash water to separate the barren solid material 324 from the (second) pregnant leach solution 328. The first and second pregnant leach solutions 304, 328 are subjected to precious metal precipitation—thiosulfate regeneration 208, further solid/liquid separation 212, conditioning 224 and precious metal scavenging 228 as noted above in connection with FIG. 2.

The process of FIG. 3 typically performs the bulk of the leaching, or precious metal dissolution, under ambient conditions, which is much cheaper than leaching under superatmospheric conditions. The more-difficult-to-dissolve precious metals and weakly preg-robbed precious metals are then dissolved in a higher pressure leach. Because less precious metal remains to be dissolved, the high pressure leach can have a shorter residence time and therefore lower capacity than would be possible in the absence of the ambient pressure leach.

Figure 4:
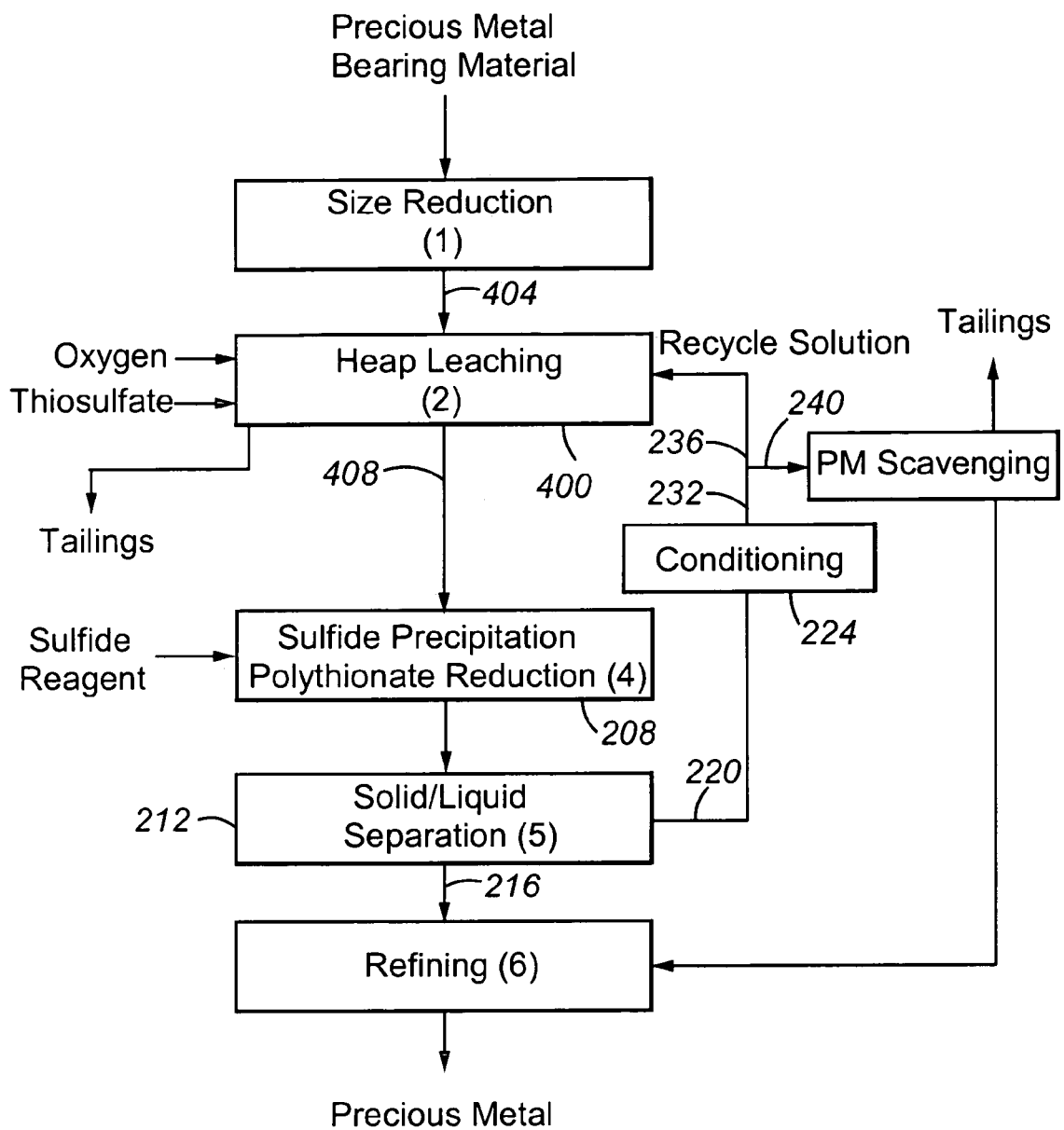
FIG. 4 is a flow schematic of a fourth embodiment of the present invention.

FIG. 4 depicts another embodiment of the present invention. The process is similar to those discussed above except that thiosulfate leaching is performed by heap leaching 400 techniques. The comminuted precious metal-containing material 404 can be directly formed into a heap (in which case the material would have a preferred $P_{80}$ size of from about 2 inches to about ¼ inch, possibly agglomerated and formed into a heap. The thiosulfate lixiviant (which commonly includes a recycled thiosulfate lixiviant 236 mixed with a makeup (fresh) thiosulfate solution (not shown)) is applied to the top of the heap using conventional techniques, and the pregnant leach solution 408 is collected from the base of the heap. Refining can be performed using any of the techniques noted above.

To facilitate extraction of gold from sulfidic and/or carbonaceous materials, the thiosulfate leach step in any of the above processes can be preceded by one or more pretreatment steps to destroy or neutralize the carbon-containing and/or sulfidic minerals. By way of example, the intermediate steps can include one or more of biooxidation or chemical oxidation to oxidize sulfides, ultrafine grinding to liberate occluded precious metals, conventional roasting to destroy carbon- and/or sulfide-containing minerals, and/or microwave roasting.

EXAMPLE 1

A gold ore from Nevada, designated Sample A, was subjected to thiosulfate leaching under oxygen pressure at varying temperatures. The ore assayed 24.1 g/t gold, 2.59% iron, 0.31% total sulfur, 0.28% sulfide sulfur, 3.40% total carbon, 1.33% organic carbon and 0.02% graphitic carbon. From a diagnostic leaching analysis of the ore it was determined that a maximum of 83% of the contained gold was capable of being solubilized while the remaining gold was inaccessible to a lixiviant because it was encapsulated within pyrite and/or other minerals contained in the ore.

The ore was ground to 80% passing 200 mesh (75 μm). Samples of the ore were slurried with water to a pulp density of 33% solids in a mechanically agitated laboratory autoclave. The natural pH of the slurry at ambient temperature was 8.3. The pH of the slurry was adjusted to 9 with sodium hydroxide and a quantity of sodium thiosulfate reagent was added to adjust the initial leach solution thiosulfate concentration to 0.1 molar (M). The autoclave was sealed and pressurized to 100 psig oxygen with pure (95% plus) oxygen gas and the slurry was heated to the desired temperature (if required). Leaching was maintained for 6 hours, during which pulp samples were taken at 2 and 4 hours in order to monitor gold extraction with time. Upon termination of leaching, the slurry was filtered and the residue solids were washed with a dilute thiosulfate solution. The residue solids and leach solution were assayed for gold to determine the final gold extraction.

The results were as follows:

| Leach Temp. (° C.) | Leach Time (hours) | Calc'd Head Au (g/t) | Residue Au (g/t) | Au Ext'n (%) |
|---|---|---|---|---|
| 20 | 2 | | | 33.3 |
| | 4 | | | 41.9 |
| | 6 | 22.8 | 9.44 | 58.5 |
| 40 | 2 | | | 51.2 |
| | 4 | | | 55.1 |
| | 6 | 26.4 | 9.25 | 64.9 |
| 60 | 2 | | | 63.7 |
| | 4 | | | 68.5 |
| | 6 | 22.8 | 4.26 | 81.3 |
| 60 (repeat) | 2 | | | 65.2 |
| | 4 | | | 73.0 |
| | 6 | | | 80.9 |

The results indicate that the rate and extent of gold extraction was improved with increasing temperature and leach time in the temperature range 20–60° C. The best results were obtained at 60° C., with about 81% gold extraction obtained after 6 hours leaching, this representing about 98% of the leachable gold content of the ore.

EXAMPLE 2

A second gold ore from Nevada, designated Sample B, was subjected to thiosulfate leaching under oxygen pressure at varying initial pH's. The ore assayed 9.45 g/t gold, 2.50% iron, 0.39% total sulfur, 0.36% sulfide sulfur, 4.20% total carbon, 1.46% organic carbon and 0.05% graphitic carbon. From a diagnostic leaching analysis of the ore it was determined that 82% of the contained gold was capable of being solubilized. Samples of the ore were prepared and leached as described in Example 1, except the temperature was 60° C. in each test, the autoclave was pressurized with 50 psig oxygen, the initial pH was adjusted to either 9, 11 or 12, and the leach retention time was extended to 8 hours for the pH 11 and 12 tests.

The results were as follows:

| Initial pH | Leach Time (hours) | Calc'd Head Au (g/t) | Residue Au (g/t) | Au Ext'n (%) |
|---|---|---|---|---|
| 9 | 1 | | | 50.2 |
| | 2 | | | 62.4 |
| | 4 | | | 72.0 |
| | 6 | 8.49 | 2.10 | 75.3 |
| 11 | 1 | | | 41.3 |
| | 2 | | | 63.0 |
| | 4 | | | 69.3 |
| | 8 | 8.61 | 2.00 | 76.8 |
| 12 | 1 | | | 6.4 |
| | 2 | | | 1.0 |
| | 4 | | | 13.6 |
| | 8 | 8.61 | 3.34 | 61.2 |

The results indicate that there was not much difference in gold leaching behaviour over the initial pH range of 9–11 (it should be noted that the pH tended to decline during leaching). However, gold leaching was suppressed during the first 4 hours of leaching at pH 12, but then started to recover.

EXAMPLE 3

A third gold ore sample from Nevada, Sample C, was subjected to thiosulfate leaching under oxygen pressure at varying temperatures. The head analysis of the ore was as follows:

| Gold Ore Sample C | | | |
|---|---|---|---|
| Au, g/t | 9.50 | C (t), % | 4.45 |
| Fe, % | 2.52 | C (CO$_3$), % | 3.12 |
| Cu, ppm | 40 | C (org), % | 1.38 |
| As, ppm | 647 | S (2−), % | 0.35 |
| Hg, ppm | 14 | S (t), % | 0.27 |
| Ca, % | 9.0 | Mg, % | 1.5 |

From a diagnostic leaching analysis of the ore it was determined that 83% of the contained gold was capable of being solubilized.

The ore was ground to 80% passing 200 mesh (75 µm). Samples of the ore were slurried with water to a pulp density of 33% solids in a mechanically agitated laboratory autoclave. The initial pH of the slurry was adjusted to approximately 11 with sodium hydroxide, after which the autoclave was sealed and pressurized to 100 psig oxygen with pure (95% plus) oxygen gas and the slurry was heated to the desired temperature. To initiate leaching, a quantity of sodium thiosulfate stock solution was injected to adjust the leach solution thiosulfate concentration to 0.1 M. Leaching was continued for 6 to 10 hours, during which no additional reagents were added. Pulp samples were taken at set intervals during leaching in order to monitor gold extraction with time. Upon termination of leaching, the slurry was filtered and the residue solids were washed with a dilute thiosulfate solution. The residue solids and leach solution were assayed for gold to determine the final gold extraction.

Figure 5:
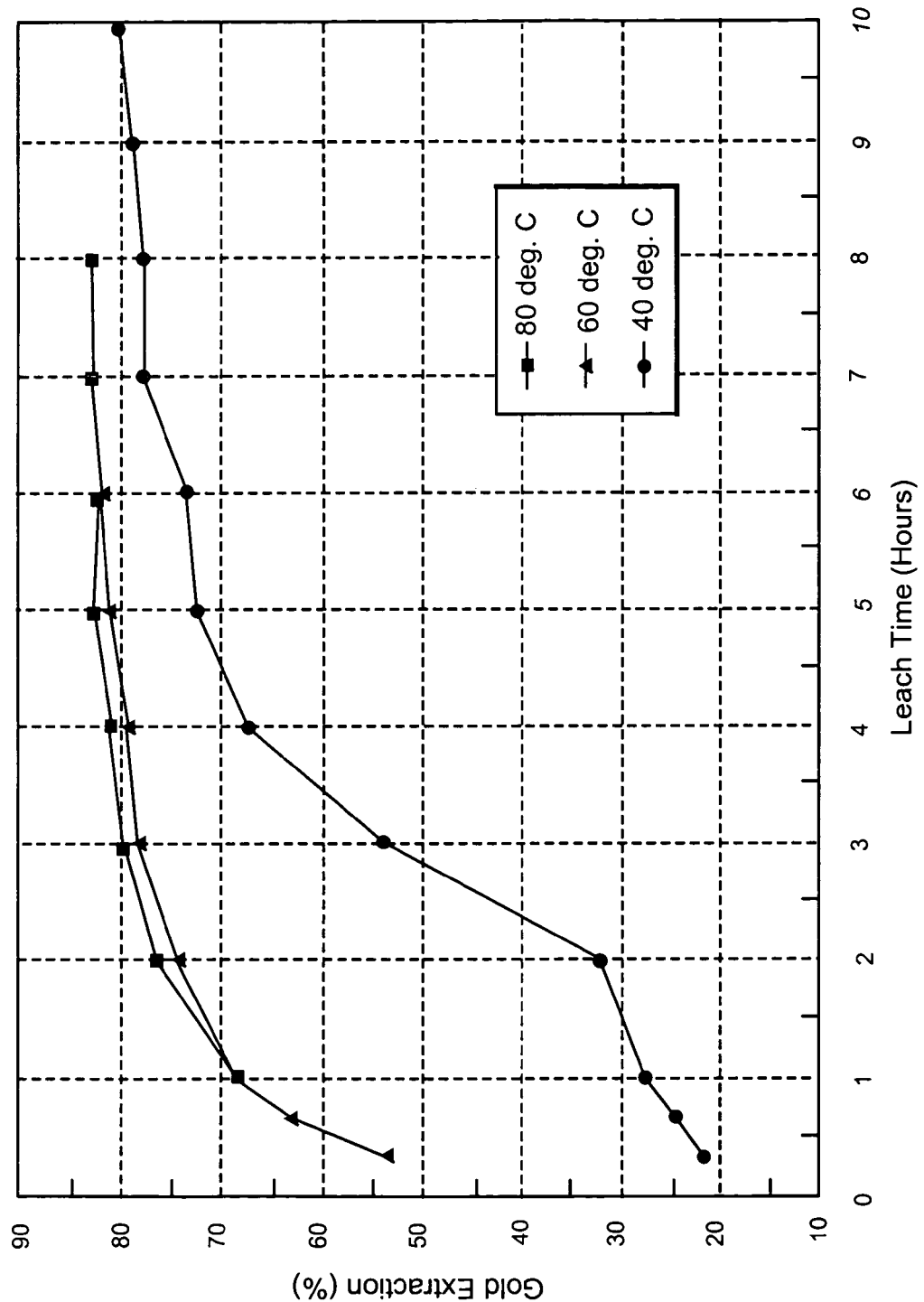
FIG. 5 is a plot of gold extraction in percent (vertical axis) versus leach time in hours (horizontal axis)

FIG. 5 depicts graphically the effect of leach temperature, in the range 40–80° C., on the rate of gold extraction from Sample C. It can be seen that the gold leached quickly at 60° C. and 80° C., there being little difference in the extraction rate at the two temperatures. The gold extraction peaked at approximately 83%, the maximum extractable, after 6 hours leaching. Gold leaching was slowed if the temperature was lowered to 40° C., but 80% gold extraction was still obtained after 10 hours leaching at 40° C.

An overall summary of the results is provided below:

| Parameter | Test #6 80° C. | Test #25 60° C. | Test #15 40° C. |
|---|---|---|---|
| Leach time, hours | 8 | 6 | 10 |
| Final pH | 7.0 | 8.7 | 9.3 |
| Final ORP, mV (SHE) | 307 | 242 | 225 |
| Calc'd Head Au, g/t | 9.48 | 9.43 | 9.27 |
| Residue Au, g/t | 1.59 | 1.63 | 1.81 |
| Au Ext'n, % | 83.2 | 82.7 | 80.5 |

EXAMPLE 4

The gold ore designated Sample C was subjected to thiosulfate leaching at varying oxygen pressures. Samples of the ore were prepared and leached as described in Example 3 except the temperature was maintained at 60° C. in each test and the oxygen partial pressure was varied.

Figure 6:
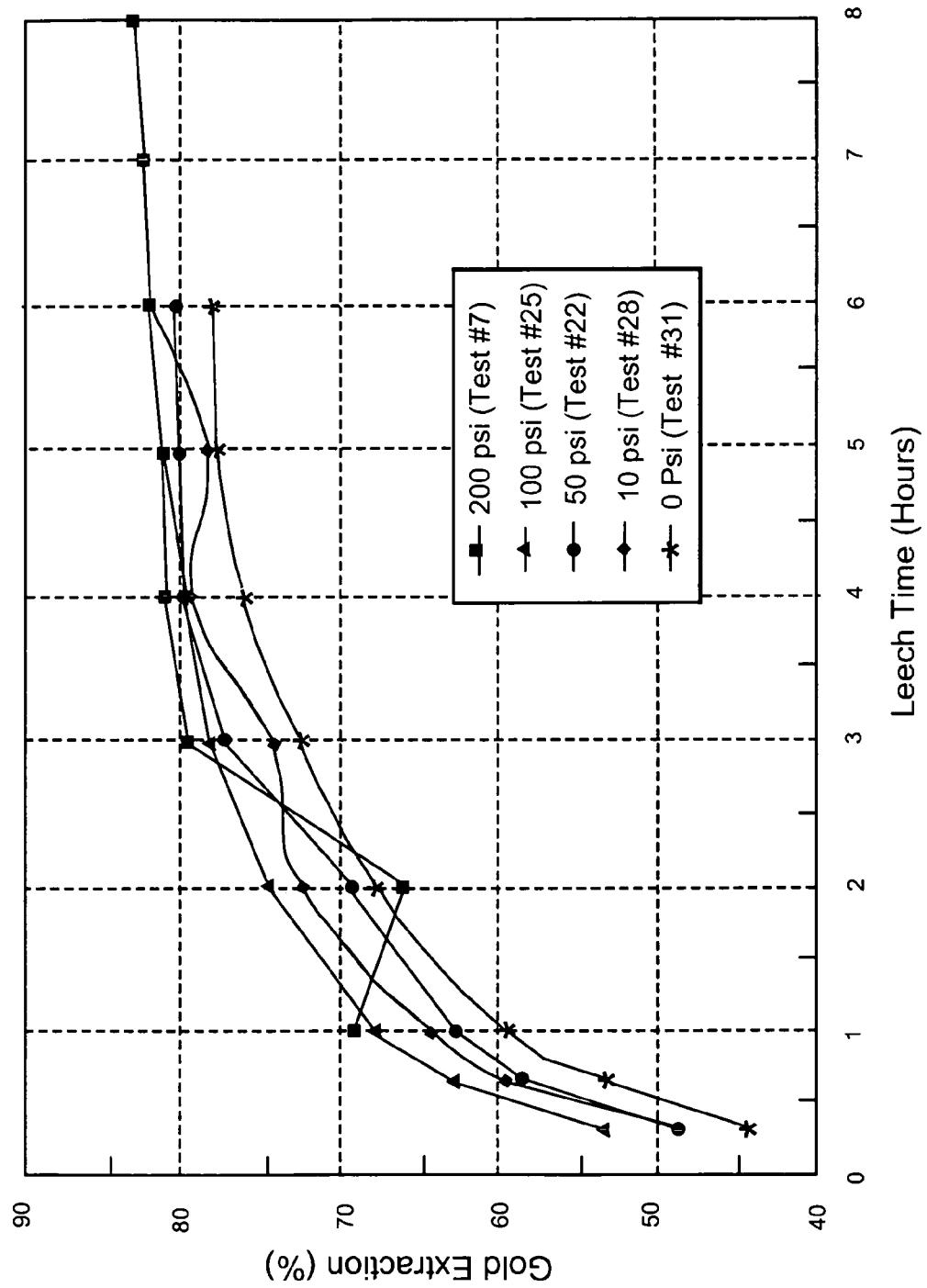
FIG. 6 is another plot of gold extraction in percent (vertical axis) versus leach time in hours (horizontal axis)

FIG. 6 portrays the effect of oxygen partial pressure, in the range 0–200 psig, on the rate of gold extraction from Sample C (in the 0 psig $O_2$ test, the autoclave was not pressurized but the head space was maintained with pure oxygen at atmospheric pressure). It can be seen that the rate of gold leaching was somewhat sensitive to oxygen pressure, in that the rate increased with increasing pressure, particularly during the first two hours of leaching. After 6 hours leaching, gold extraction varied from a low of 78% at 0 psig $O_2$ to a high of 83% at 200 psig $O_2$.

An overall summary of the results is provided below:

| Parameter | Test #7 200 psig $O_2$ | Test #25 100 psig $O_2$ | Test #22 50 psig $O_2$ | Test #28 10 psig $O_2$ | Test #31 0 psig $O_2$ |
|---|---|---|---|---|---|
| Leach time, hours | 8 | 6 | 6 | 6 | 6 |
| Final pH | NA | 8.7 | 9.0 | 9.3 | 9.4 |
| Final ORP, mV (SHE) | NA | 242 | 223 | 216 | 232 |
| Calc'd Head Au, g/t | 9.78 | 9.43 | 9.40 | 8.95 | 9.08 |
| Residue Au, g/t | 1.68 | 1.63 | 1.77 | 1.72 | 2.00 |
| Au Ext'n, % | 82.8 | 82.7 | 81.1 | 80.8 | 78.0 |

NA = not analyzed

EXAMPLE 5

The gold ore designated Sample C was subjected to thiosulfate leaching under oxygen pressure at varying initial sodium thiosulfate concentrations. Samples of the ore were prepared and leached as described in Example 3 except the temperature was maintained at 60° C. in each test and the initial sodium thiosulfate concentration was varied.

Figure 7:
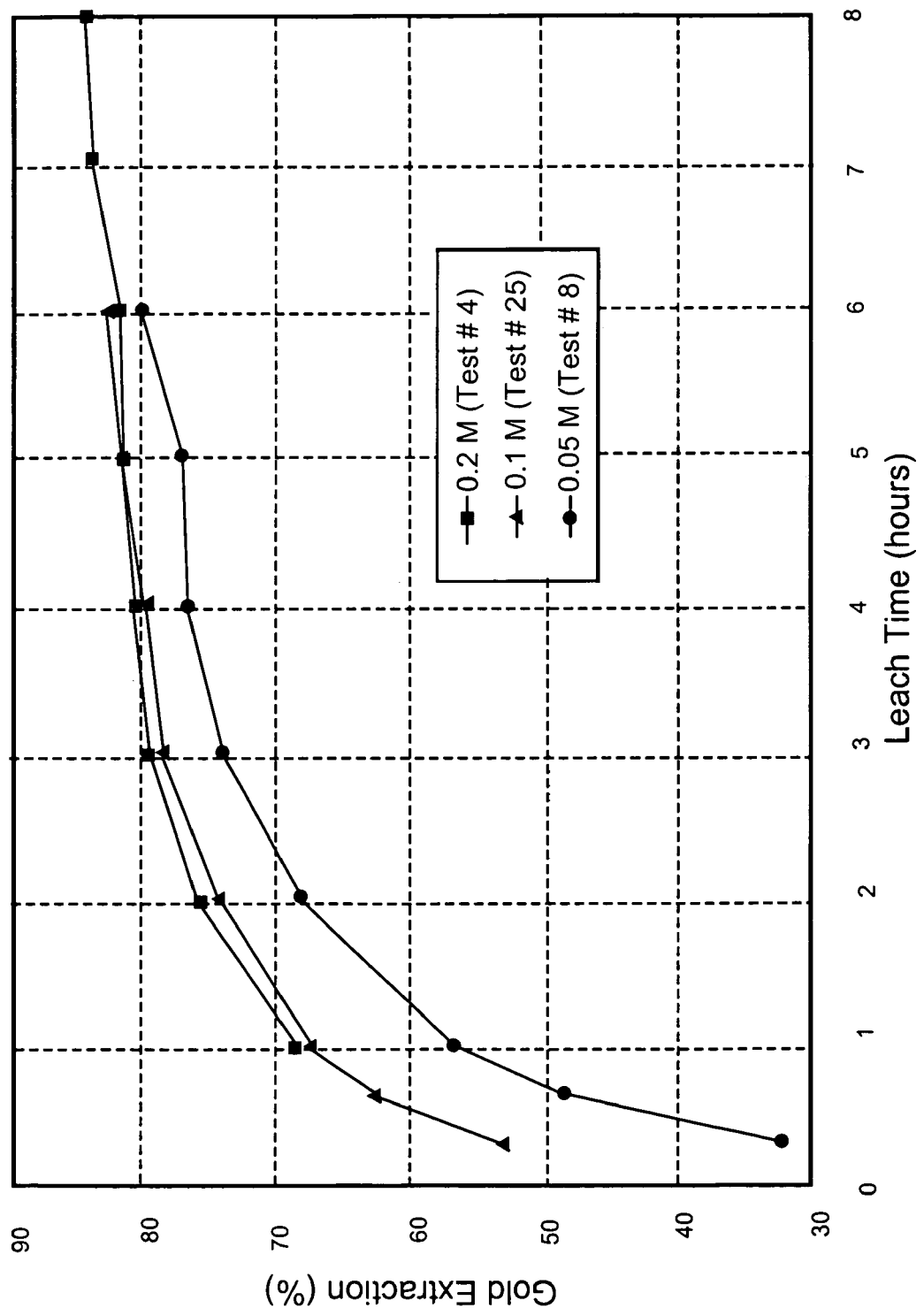
FIG. 7 is another plot of gold extraction in percent (vertical axis) versus leach time in hours (horizontal axis)

FIG. 7 portrays the effect of initial sodium thiosulfate concentration, in the range 0.05–0.2 M, on the rate of gold extraction from Sample C. It can be seen that the rate of gold leaching was insensitive to initial thiosulfate concentration in the 0.1–0.2 M range. At 0.05 M thiosulfate, the rate was reduced significantly, particularly during the first two hours of leaching. After 6 hours leaching gold extraction was 78% at 0.05 M thiosulfate compared to 82% achieved at both 0.1 M and 0.2 M thiosulfate concentration.

An overall summary of the results is provided below:

| Parameter | Test #4 0.2 M | Test #25 0.1 M | Test #8 0.05 M |
|---|---|---|---|
| Leach time, hours | 8 | 6 | 6 |
| Final pH | 8.7 | 8.7 | 8.5 |
| Final ORP, mV (SHE) | NA | 242 | 262 |
| Calc'd Head Au, g/t | 8.85 | 9.43 | 9.40 |
| Residue Au, g/t | 1.50 | 1.63 | 1.87 |
| Au Ext'n, % | 83.0 | 82.7 | 80.1 |

NA = not analysed

EXAMPLE 6

The gold ore designated Sample C was subjected to thiosulfate leaching under oxygen pressure at two different pulp densities. Samples of the ore were prepared and leached as described in Example 3, except the temperature was maintained at 60° C. in each test and the leach pulp density was either 33% or 45% solids by weight.

Figure 8:
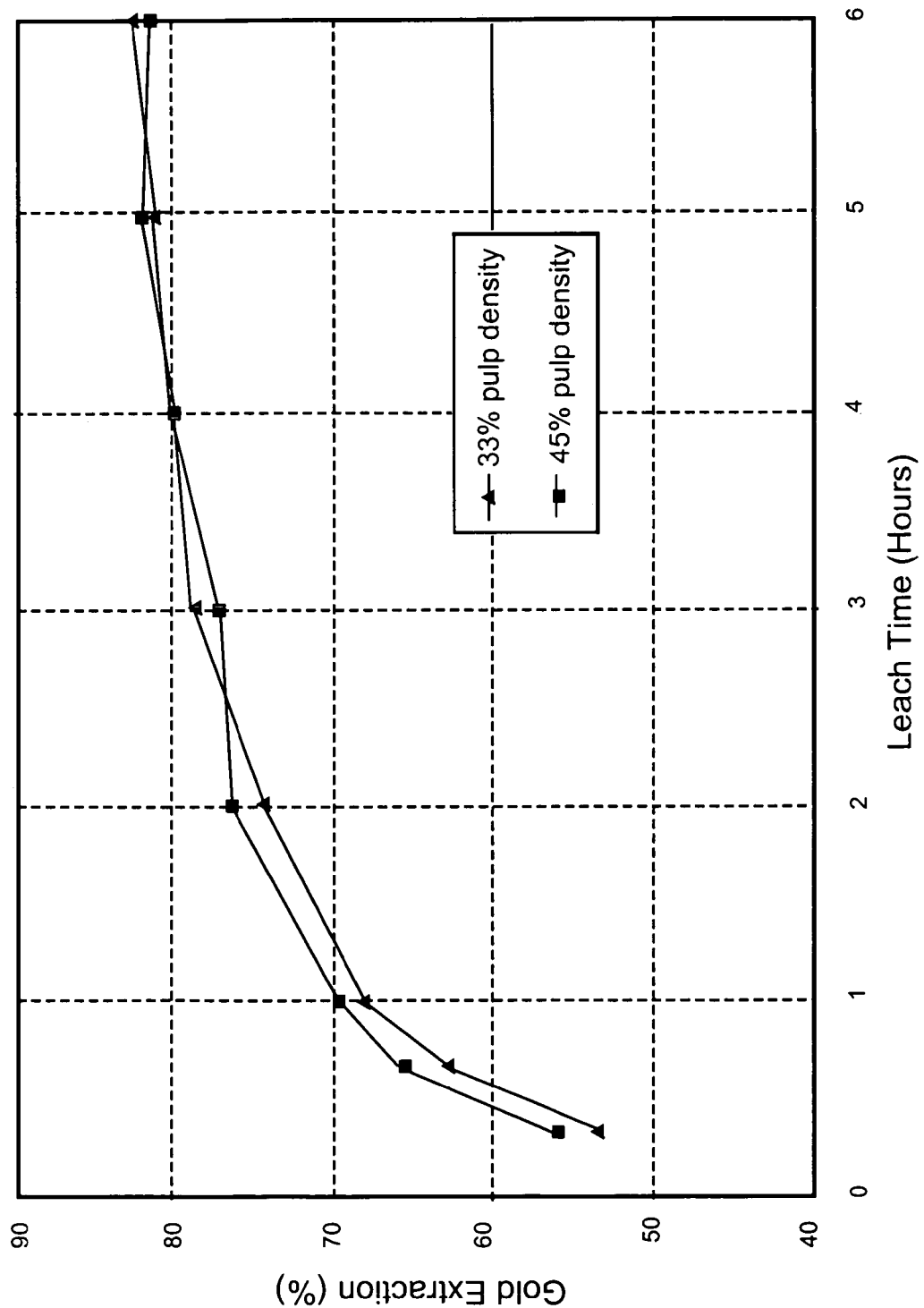
FIG. 8 is another plot of gold extraction in percent (vertical axis) versus leach time in hours (horizontal axis)

FIG. 8 portrays the effect of 33% vs. 45% pulp density on the rate of gold extraction from Sample C. The rate of gold leaching was found to be essentially insensitive to pulp density in this range.

An overall summary of the results is provided below:

| Parameter | Test #26 45% pulp density | Test #25 33% pulp density |
|---|---|---|
| Leach time, hours | 6 | 6 |
| Final pH | 8.5 | 8.7 |
| Final ORP, mV (SHE) | 286 | 242 |
| Calc'd Head Au, g/t | 9.29 | 9.43 |
| Residue Au, g/t | 1.68 | 1.63 |
| Au Ext'n, % | 81.9 | 82.7 |

EXAMPLE 7

A fourth gold ore sample from Nevada, Sample D, was subjected to thiosulfate leaching at 60° C. and 10 psig oxygen pressure at the natural pH of the slurry, for 8 hours. The head analysis of the ore was as follows:

| Gold Ore Sample D | | | |
|---|---|---|---|
| Au, g/t | 12.15 | C (t), % | 4.31 |
| Fe, % | 2.09 | C ($CO_3$), % | 3.02 |
| Cu, ppm | 39 | C (org), % | 1.30 |
| As, ppm | 692 | S (2−), % | 0.12 |
| Hg, ppm | 27 | S (t), % | 0.22 |
| Ca, % | 8.9 | Mg, % | 1.3 |

From a diagnostic leaching analysis of the ore it was determined that 80% of the contained gold was capable of being solubilized.

The ore was ground to 80% passing 200 mesh (75 μm). A sample of the ore was slurried with water to a pulp density of 40% solids in a mechanically agitated laboratory autoclave. The autoclave was sealed and pressurized to 100 psig oxygen with pure (95% plus) oxygen gas and the slurry was heated to 60° C. To initiate leaching, a quantity of sodium thiosulfate stock solution was injected to adjust the leach solution thiosulfate concentration to 0.1 M. Leaching was continued for 8 hours, during which no additional reagents were added. Pulp samples were taken at set intervals during leaching in order to monitor gold extraction and remaining thiosulfate with time. Upon termination of leaching, the slurry was filtered and the residue solids were washed with a dilute thiosulfate solution. The residue solids and leach solution were assayed for gold to determine the final gold extraction.

Figure 9:
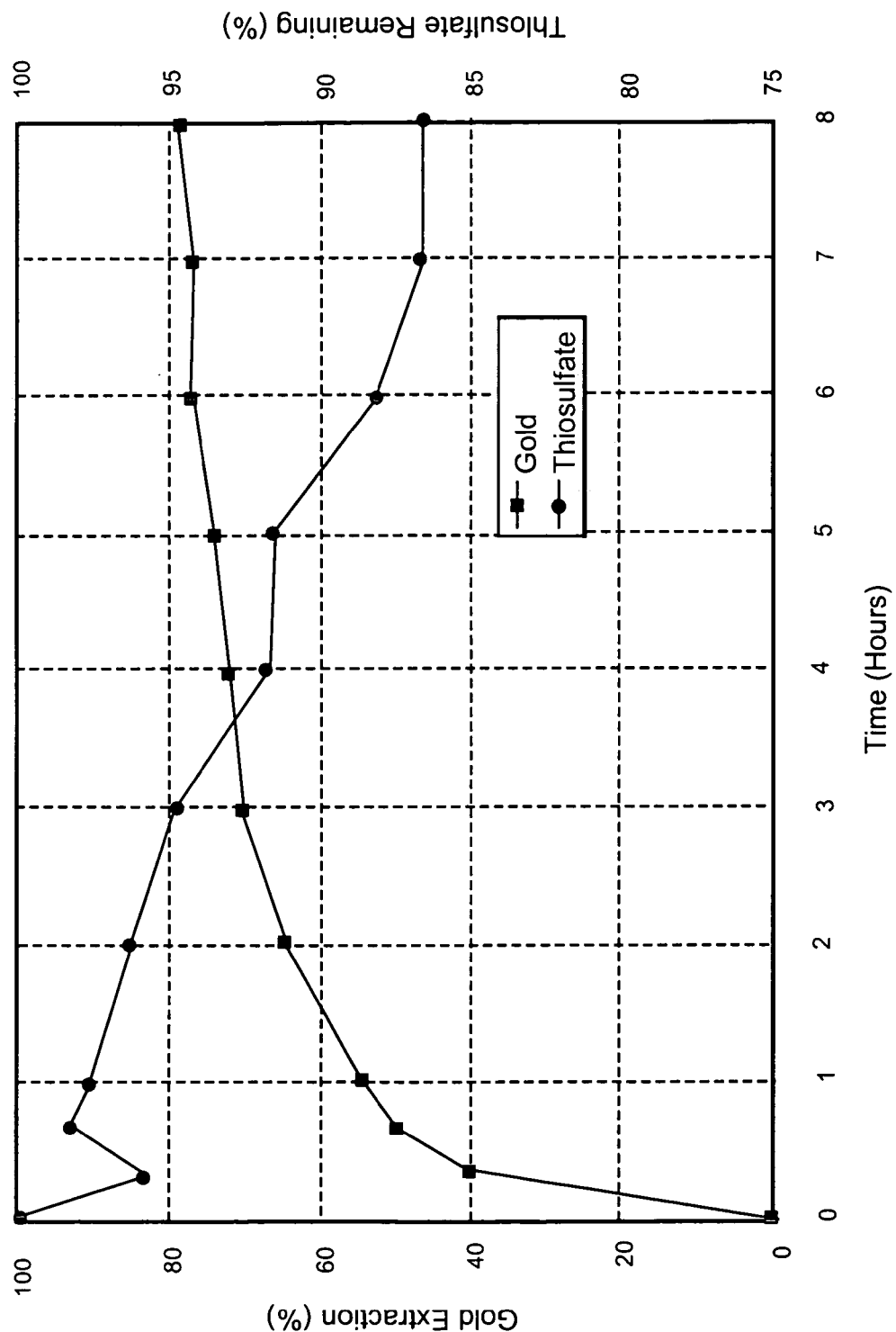
FIG. 9 is a plot of gold extraction in percent (left vertical axis) and thiosulfate remaining in percent (right vertical axis) versus leach time in hours (horizontal axis).

FIG. 9 depicts percent gold extraction and percent remaining thiosulfate with time. Gold extraction reached 79.3% after 8 hours, or 99% of the leachable gold content. Thiosulfate consumption was low, with 86.7% of the thiosulfate remaining after 8 hours and available for reuse.

An overall summary of the results is provided below:

| Parameter | Test #37-01 |
|---|---|
| Leach time, hours | 8 |
| Initial pH | 7.9 |
| Final pH | 9.0 |
| Initial ORP, mV (SHE) | 411 |
| Final ORP, mV (SHE) | 397 |
| Calc'd head Au, g/t | 11.50 |
| Residue Au, g/t | 2.38 |
| Gold extraction, % | 79.3 |
| Amount of thiosulfate remaining, % | 86.7 |

EXAMPLE 8

A thiosulfate leach discharge slurry was heated to 60° C. in an agitated reactor in preparation for RIP pre-treatment, the objective being to reduce the polythionate content without precipitating gold. The slurry was kept under a nitrogen atmosphere to ensure the dissolved oxygen content was maintained below 0.2 mg/L. A single dose of a 0.26 M sodium bisulfide (NaHS) solution, adjusted to pH 9, was added and the pretreatment was allowed to proceed at 60° C. and ambient pressure for 2 hours. The amount of sulfide added was 150% of stoichiometric based on the amount required to convert the polythionates back to thiosulfate in accordance with the following reactions:

$$2S_4O_6^{2-} + S^{2-} + 3/2 H_2O \rightarrow 9/2 S_2O_3^{2-} + 3H^+$$

$$S_3O_6^{2-} + S^{2-} \rightarrow 2S_2O_3^{2-}$$

A summary of the results is provided below:

| Time (min) | Au (mg/L) | $S_2O_3^{2-}$ (g/L) | $S_4O_6^{2-}$ (g/L) | $S_3O_6^{2-}$ (g/L) | ORP (mV) | pH |
|---|---|---|---|---|---|---|
| 0 | 4.36 | 8.38 | 0.51 | 0.59 | 240 | 6.9 |
| 120 | 4.36 | 11.0 | 0.06 | 0.10 | 5 | 6.7 |

The tetrathionate and trithionate concentrations were reduced by 88% and 83% respectively while all of the gold remained in solution.

EXAMPLE 9

A pregnant thiosulfate leach solution was adjusted to pH 10 with sodium hydroxide in an agitated reactor in preparation for sulfide treatment, the objective being to regenerate thiosulfate and precipitate the gold. The solution was kept under a nitrogen atmosphere to ensure the dissolved oxygen content was maintained below 0.2 mg/L. A single dose of a 0.26 M sodium sulfide (Na$_2$S) solution was added and the treatment was allowed to proceed for 2 hours at ambient temperature (22° C.) and pressure. The amount of sulfide added was 100% if stoichiometric based on the amount required to convert the polythionates back to thiosulfate in accordance with the following reactions:

$$2S_4O_6^{2-} + S^{2-} + 3/2 H_2O \rightarrow 9/2 S_2O_3^{2-} + 3H^+$$

$$S_3O_6^{2-} + S^{2-} \rightarrow 2S_2O_3^{2-}$$

A summary of the results is provided below:

| Time (mm) | Au (mg/L) | $S_2O_3^{2-}$ (g/L) | $S_4O_6^{2-}$ (g/L) | $S_3O_6^{2-}$ (g/L) | ORP (mV) | pH |
|---|---|---|---|---|---|---|
| 0 | 4.12 | 7.8 | 0.84 | 1.47 | 200 | 10.0 |
| 10 | 0.05 | 9.9 | 0.01 | 0.01 | −210 | 11.0 |
| 20 | 0.02 | 9.9 | 0.01 | 0.01 | −220 | 10.4 |
| 30 | 0.01 | 9.9 | 0.01 | 0.01 | −230 | 10.2 |
| 60 | 0.01 | 9.8 | 0.01 | 0.01 | −260 | 10.3 |
| 90 | 0.01 | 10.1 | 0.01 | 0.01 | −260 | 10.3 |
| 120 | 0.01 | 10.2 | 0.01 | 0.01 | −260 | 10.3 |

The rate of conversion of polythionates to thiosulfate was extremely fast under ambient conditions, with essentially complete conversion achieved after about 10 minutes. Similarly, gold precipitation was also fast and essentially complete after about 30 minutes.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. By way of example, any source of sulfur species with an oxidation state less than +2 may be used in any of the above process steps to convert polythionates to thiosulfate. The regeneration step 184 in FIG. 1 can be performed in a variety of locations. For example, regeneration 184 can be performed in the recycle loop after CCD 172 and before grinding 108, between grinding 108 and thickening 116, in the thickener 116 immediately before or during, leaching 132 and/or between resin in pulp 164 and CCD 172. Fresh thiosulfate can also be added in a number of locations. For example, fresh thiosulfate can be added in any of the locations referred to previously for the regeneration step 184 and can be added after or during regeneration 184 as noted above or in a separate tank or location. In FIG. 3, a lixiviant other than thiosulfate, such as cyanide, can be used in the atmospheric leach 300 with thiosulfate being used in the pressure leach 312. These and other changes may be made without departing from the spirit and scope of the present invention.

What is claimed is:

1. A process for recovering a precious metal from a precious metal-containing material, comprising:
    (a) contacting the precious metal-containing material with a thiosulfate lixiviant at superatmospheric pressure in the substantial or complete absence of added ammonia to solubilize the precious metal and form a pregnant thiosulfate leach solution containing the solubilized precious metal; and
    (b) thereafter recovering the solubilized precious metal from the pregnant thiosulfate leach solution, wherein the total ammonia concentration in the thiosulfate lixiviant is less than about 0.05M.

2. The process of claim 1, wherein in the contacting step the thiosulfate lixiviant has a pH of less than 9 and a temperature of from about 40 to about 80° C., and the total ammonia concentration in the thiosulfate lixiviant is less than about 0.03M.

3. The process of claim 1, wherein in the contacting step the thiosulfate lixiviant contains less than about 20 ppm of copper ion.

4. The process of claim 1, wherein the lixiviant includes dissolved molecular oxygen and wherein the thiosulfate lixiviant in step (a) is free of added copper.

5. The process of claim 1, wherein the thiosulfate lixiviant contains no more than about 0.01M of added sulfite.

6. The process of claim 1, wherein the thiosulfate lixiviant includes sulfite and a total concentration of sulfite in the thiosulfate lixiviant is no more than about 0.02M.

7. A process for recovering a precious metal from a carbonaceous precious metal-containing material, comprising:
(a) contacting the carbonaceous precious metal-containing material with a thiosulfate lixiviant in the substantial or complete absence of added copper and added ammonia to solubilize the precious metal and form a pregnant thiosulfate leach solution containing the solubilized precious metal; and
(b) thereafter recovering the solubilized precious metal from the pregnant thiosulfate leach solution, wherein, in the contacting step, the thiosulfate lixiviant contains less than about 20 ppm of copper ion.

8. The process of claim 7, wherein in the contacting step the thiosulfate lixiviant has a pH of less than 9 and a temperature of from about 40 to about 80° C., and the total ammonia concentration in the thiosulfate lixiviant is less than about 0.05M.

9. The process of claim 7, wherein, in the contacting step, the thiosulfate lixiviant contains less than about 15 ppm of copper ion.

10. The process of claim 7, wherein the lixiviant includes molecular oxygen.

11. The process of claim 7, wherein the thiosulfate lixiviant contains no more than about 0.01M of added sulfite.

12. The process of claim 7, wherein the thiosulfate lixiviant includes sulfite and a total concentration of sulfite in the thiosulfate lixiviant is no more than about 0.02M.

13. A process for recovering a precious metal from a precious metal-containing material, comprising:
(a) contacting the precious metal-containing material with a thiosulfate lixiviant at superatmospheric pressure in the substantial or complete absence of at least one of added copper and added ammonia to solubilize the precious metal and form a pregnant thiosulfate leach solution containing the solubilized precious metal; and
(b) thereafter recovering the solubilized precious metal from the pregnant thiosulfate leach solution, wherein in the contacting step the thiosulfate lixiviant contains less than about 20 ppm of copper ion.

14. The process of claim 13, wherein in the contacting step the thiosulfate lixiviant has a pH of less than 9 and a temperature of from about 40 to about 80° C., and the total ammonia concentration in the thiosulfate lixiviant is less than about 0.05M.

15. The process of claim 13, wherein the lixiviant includes dissolved molecular oxygen.

16. The process of claim 13, wherein the thiosulfate lixiviant contains no more than about 0.01M of added sulfite and wherein, in the contacting step, the thiosulfate lixiviant contains less than about 15 ppm of copper ion.

17. The process of claim 13, wherein the thiosulfate lixiviant includes sulfite and a total concentration of sulfite in the thiosulfate lixiviant is no more than about 0.02M.

18. The process of claim 13, further comprising:
maintaining a dissolved molecular oxygen content in at least one of the thiosulfate lixiviant and pregnant leach solution at or below about 1 ppm to inhibit the formation of the trithionate and tetrathionate.

19. A process for recovering a precious metal from a carbonaceous precious metal-containing material, comprising:
(a) contacting the carbonaceous precious metal-containing material with a thiosulfate lixiviant in the substantial or complete absence of added copper and added ammonia to solubilize the precious metal and form a pregnant thiosulfate leach solution containing the solubilized precious metal; and
(b) thereafter recovering the solubilized precious metal from the pregnant thiosulfate leach solution, wherein the total ammonia concentration in the thiosulfate lixiviant is less than about 0.05M.

20. The process of claim 19, wherein in the contacting step the thiosulfate lixiviant has a pH of less than 9 and a temperature of from about 40 to about 80° C.

21. The process of claim 19, wherein in the contacting step the thiosulfate lixiviant contains less than 20 ppm of copper ion.

22. The process of claim 19, wherein the lixiviant includes molecular oxygen.

23. The process of claim 19, wherein the thiosulfate lixiviant contains no more than about 0.01M of added sulfite.

24. The process of claim 19, wherein the thiosulfate lixiviant includes sulfite and a total concentration of sulfite in the thiosulfate lixiviant is no more than about 0.02M.

25. The process of claim 19, wherein the solubilized precious metal is recovered from the pregnant thiosulfate leach solution by electrowinning.

26. The process of claim 19, further comprising:
maintaining a dissolved molecular oxygen content in at least one of the thiosulfate lixiviant and pregnant leach solution at or below about 1 ppm to inhibit the formation of the trithionate and tetrathionate.

27. The process of claim 1, wherein the thereafter recovering step (b) comprises:
(i) contacting the pregnant leach solution with a sulfide-containing reagent to convert at least most of the polythionate to thiosulfate, wherein, in the contacting step (i), the pregnant leach solution has a dissolved molecular oxygen content of no more than about 1 ppm; and
(ii) thereafter recovering the precious metal precipitate from the thiosulfate leach solution.

28. The process of claim 27, further comprising before the contacting step (i):
(iii) separating at least most of the precious metal-containing material from at least most of the pregnant thiosulfate leach solution.

29. The process of claim 27, wherein the sulfide-containing reagent is at least one of (i) a polysulfide other than a bisulfide, (ii) a bisulfide, and (iii) a sulfide other than a bisulfide and a polysulfide.

30. The process of claim 27, wherein the pregnant leach solution in contacting step (i) has a pH ranging from about pH 5.5 to about pH 12.

31. The process of claim 27, wherein in the contacting step (i), at least most of the solubilized precious metal is precipitated by reaction with the sulfide-containing reagent.

32. The process of claim 31, wherein the thereafter recovering step (b) includes separating the precious metal precipitates from a barren leach solution.

33. The process of claim 32, further comprising:
(c) adjusting a pH of the barren leach solution to a pH of from about pH 7 to about pH 12;
(d) contacting the barren leach solution with a gas including at least about 5 vol. % molecular oxygen to oxidize any remaining sulfide-containing reagent; and (e) recovering precious metal from at least a portion of the barren leach solution.

34. The process of claim 1, further comprising, after the contacting step (b):
converting at least most of at least one of trithionate and tetrathionate in the pregnant thiosulfate leach solution into thiosulfate while maintaining at least most of the solubilized precious metals dissolved in the pregnant thiosulfate leach solution.

35. The process of claim 34, wherein the converting step includes:
contacting the pregnant thiosulfate leach solution with at least one of a sulfite and a sulfide.

36. The process of claim 34, wherein the converting step includes:
heating the pregnant thiosulfate leach solution to a temperature of more than 60° C.

37. The process of claim 1, further comprising:
contacting the pregnant thiosulfate leach solution and/or a barren thiosulfate leach solution with a sulfide and/or bisulfide and/or a polysulfide to convert polythionates in the pregnant thiosulfate leach solution and/or barren thiosulfate leach solution into thiosulfate; and
thereafter contacting the pregnant thiosulfate leach solution and/or barren thiosulfate leach solution with an oxidant to solubilize precipitated precious metal precipitates.

38. The process of claim 37, wherein the oxidant is molecular oxygen, the concentration of dissolved molecular oxygen in the pregnant leach solution and/or barren thiosulfate leach solution is at least about 1 ppm, and the pregnant leach solution and/or barren thiosulfate leach solution has a pH of from about pH 5.5 to about pH 12.

39. The process of claim 7, wherein the pregnant thiosulfate leach solution comprises polythionate and wherein the thereafter recovering step (b) comprises:
(i) contacting the pregnant thiosulfate leach solution with a sulfide-containing reagent to convert at least most of the polythionate to thiosulfate, wherein, in the contacting step (i), the pregnant leach solution has a dissolved molecular oxygen content of no more than about 1 ppm; and
(ii) thereafter recovering the precious metal precipitate from the thiosulfate leach solution.

40. The process of claim 39, further comprising before the contacting step (i):
(iii) separating at least most of the precious metal-containing material from at least most of the pregnant thiosulfate leach solution.

41. The process of claim 39, wherein the sulfide-containing reagent is at least one of (i) a polysulfide other than a bisulfide, (ii) a bisulfide, and (iii) a sulfide other than a bisulfide and a polysulfide.

42. The process of claim 39, wherein the pregnant leach solution in contacting step (i) has a pH ranging from about pH 5.5 to about pH 12.

43. The process of claim 39, wherein in the contacting step (i), at least most of the solubilized precious metal is precipitated by reaction with the sulfide-containing reagent.

44. The process of claim 43, wherein the thereafter recovering step (b) includes separating the precious metal precipitates from a barren leach solution.

45. The process of claim 44, further comprising:
(c) adjusting a pH of the barren leach solution to a pH of from about pH 7 to about pH 12;

(d) contacting the barren leach solution with a gas including at least about 5 vol. % molecular oxygen to oxidize any remaining sulfide-containing reagent; and
(e) recovering precious metal from at least a portion of the barren leach solution.

46. The process of claim 7, further comprising, after the contacting step (b):
converting at least most of at least one of trithionate and tetrathionate in the pregnant thiosulfate leach solution into thiosulfate while maintaining at least most of the solubilized precious metals dissolved in the pregnant thiosulfate leach solution.

47. The process of claim 46, wherein the converting step includes:
contacting the pregnant thiosulfate leach solution with at least one of a sulfite and a sulfide.

48. The process of claim 46, wherein the converting step includes:
heating the pregnant thiosulfate leach solution to a temperature of more than 60° C.

49. The process of claim 7, further comprising:
contacting the pregnant thiosulfate leach solution and/or a barren thiosulfate leach solution with a sulfide and/or bisulfide and/or a polysulfide to convert polythionates in the pregnant thiosulfate leach solution and/or barren thiosulfate leach solution into thiosulfate; and
thereafter contacting the pregnant thiosulfate leach solution and/or barren thiosulfate leach solution with an oxidant to solubilize precipitated precious metal precipitates.

50. The process of claim 49, wherein the oxidant is molecular oxygen, the concentration of dissolved molecular oxygen in the pregnant leach solution and/or barren thiosulfate leach solution is at least about 1 ppm, and the pregnant leach solution and/or barren thiosulfate leach solution has a pH of from about pH 5.5 to about pH 12.

51. The process of claim 13, wherein the thereafter recovering step (b) comprises:
(i) contacting the pregnant leach solution with a sulfide-containing reagent to convert at least most of the polythionate to thiosulfate, wherein, in the contacting step (i), the pregnant leach solution has a dissolved molecular oxygen content of no more than about 1 ppm; and
(ii) thereafter recovering the precious metal precipitate from the thiosulfate leach solution.

52. The process of claim 51, further comprising before the contacting step (i):
(iii) separating at least most of the precious metal-containing material from at least most of the pregnant thiosulfate leach solution.

53. The process of claim 51, wherein the sulfide-containing reagent is at least one of (i) a polysulfide other than a bisulfide, (ii) a bisulfide, and (iii) a sulfide other than a bisulfide and a polysulfide.

54. The process of claim 51, wherein the pregnant leach solution in contacting step (i) has a pH ranging from about pH 5.5 to about pH 12.

55. The process of claim 51, wherein in the contacting step (i), at least most of the solubilized precious metal is precipitated by reaction with the sulfide-containing reagent.

56. The process of claim 55, wherein the thereafter recovering step (b) includes separating the precious metal precipitates from a barren leach solution.

57. The process of claim 56, further comprising:
(c) adjusting a pH of the barren leach solution to a pH of from about pH 7 to about pH 12;

(d) contacting the barren leach solution with a gas including at least about 5 vol. % molecular oxygen to oxidize any remaining sulfide-containing reagent; and (e) recovering precious metal from at least a portion of the barren leach solution.

58. The process of claim 13, further comprising, after the contacting step (b):

converting at least most of at least one of trithionate and tetrathionate in the pregnant thiosulfate leach solution into thiosulfate while maintaining at least most of the solubilized precious metals dissolved in the pregnant thiosulfate leach solution.

59. The process of claim 58, wherein the converting step includes:

contacting the pregnant thiosulfate leach solution with at least one of a sulfite and a sulfide.

60. The process of claim 58, wherein the converting step includes:

heating the pregnant thiosulfate leach solution to a temperature of more than 60° C.

61. The process of claim 13, further comprising:

contacting the pregnant thiosulfate leach solution and/or a barren thiosulfate leach solution with a sulfide and/or bisulfide and/or a polysulfide to convert polythionates in the pregnant thiosulfate leach solution and/or barren thiosulfate leach solution into thiosulfate; and thereafter contacting the pregnant thiosulfate leach solution and/or barren thiosulfate leach solution with an oxidant to solubilize precipitated precious metal precipitates.

62. The process of claim 61, wherein the oxidant is molecular oxygen, the concentration of dissolved molecular oxygen in the pregnant leach solution and/or barren thiosulfate leach solution is at least about 1 ppm, and the pregnant leach solution and/or barren thiosulfate leach solution has a pH of from about pH 5.5 to about pH 12.

63. The process of claim 19, wherein the thereafter recovering step (b) comprises:

(i) contacting the pregnant leach solution with a sulfide-containing reagent to convert at least most of the polythionate to thiosulfate, wherein, in the contacting step (i), the pregnant leach solution has a dissolved molecular oxygen content of no more than about 1 ppm; and (ii) thereafter recovering the precious metal precipitate from the thiosulfate leach solution.

64. The process of claim 63, further comprising before the contacting step (i):

(iii) separating at least most of the precious metal-containing material from at least most of the pregnant thiosulfate leach solution.

65. The process of claim 63, wherein the sulfide-containing reagent is at least one of (i) a polysulfide other than a bisulfide, (ii) a bisulfide, and (iii) a sulfide other than a bisulfide and a polysulfide.

66. The process of claim 63, wherein the pregnant leach solution in contacting step (i) has a pH ranging from about pH 5.5 to about pH 12.

67. The process of claim 63, wherein in the contacting step (i), at least most of the solubilized precious metal is precipitated by reaction with the sulfide-containing reagent.

68. The process of claim 67, wherein the thereafter recovering step (b) includes separating the precious metal precipitates from a barren leach solution.

69. The process of claim 68, further comprising:

(c) adjusting a pH of the barren leach solution to a pH of from about pH 7 to about pH 12;

(d) contacting the barren leach solution with a gas including at least about 5 vol. % molecular oxygen to oxidize any remaining sulfide-containing reagent; and (e) recovering precious metal from at least a portion of the barren leach solution.

70. The process of claim 19, further comprising, after the contacting step (b):

converting at least most of at least one of trithionate and tetrathionate in the pregnant thiosulfate leach solution into thiosulfate while maintaining at least most of the solubilized precious metals dissolved in the pregnant thiosulfate leach solution.

71. The process of claim 70, wherein the converting step includes:

contacting the pregnant thiosulfate leach solution with at least one of a sulfite and a sulfide.

72. The process of claim 70, wherein the converting step includes:

heating the pregnant thiosulfate leach solution to a temperature of more than 60° C.

73. The process of claim 19, further comprising:

contacting the pregnant thiosulfate leach solution and/or a barren thiosulfate leach solution with a sulfide and/or bisulfide and/or a polysulfide to convert polythionates in the pregnant thiosulfate leach solution and/or barren thiosulfate leach solution into thiosulfate; and thereafter contacting the pregnant thiosulfate leach solution and/or barren thiosulfate leach solution with an oxidant to solubilize precipitated precious metal precipitates.

74. The process of claim 73, wherein the oxidant is molecular oxygen, the concentration of dissolved molecular oxygen in the pregnant leach solution and/or barren thiosulfate leach solution is at least about 1 ppm, and the pregnant leach solution and/or barren thiosulfate leach solution has a pH of from about pH 5.5 to about pH 12.

* * * * *